(12) United States Patent
Nakashima

(10) Patent No.: US 12,728,622 B2
(45) Date of Patent: Sep. 8, 2026

(54) METHOD FOR PRODUCING DISCOLORING BODY

(71) Applicants: THE PILOT INK CO., LTD., Aichi-ken (JP); KABUSHIKI KAISHA PILOT CORPORATION, Tokyo-to (JP)

(72) Inventor: Akio Nakashima, Aichi-ken (JP)

(73) Assignees: THE PILOT INK CO., LTD., Aichi-Ken (JP); KABUSHIKI KAISHA PILOT CORPORATION, Tokyo-to (JP)

( * ) Notice: Subject to any disclaimer, the term of this patent is extended or adjusted under 35 U.S.C. 154(b) by 168 days.

(21) Appl. No.: 18/765,702

(22) Filed: Jul. 8, 2024

(65) Prior Publication Data

US 2024/0359425 A1 Oct. 31, 2024

Related U.S. Application Data

(62) Division of application No. 16/625,832, filed as application No. PCT/JP2018/023980 on Jun. 25, 2018, now Pat. No. 12,083,782.

(30) Foreign Application Priority Data

Jun. 29, 2017 (JP) ................................ 2017-127459
Jun. 29, 2017 (JP) ................................ 2017-127460
(Continued)

(51) Int. Cl.
*B41J 2/005* (2006.01)
*B32B 7/023* (2019.01)
(Continued)

(52) U.S. Cl.
CPC ................ *B32B 7/023* (2019.01); *B32B 7/12* (2013.01); *B32B 37/025* (2013.01);
(Continued)

(58) Field of Classification Search
CPC ............. B41J 2/0057; B32B 2307/406; B32B 2255/28; B32B 37/025; Y10T 428/24909
See application file for complete search history.

(56) References Cited

U.S. PATENT DOCUMENTS 5,085,607 A 2/1992 Shibahashi et al.
6,228,804 B1 5/2001 Nakashima
(Continued)

FOREIGN PATENT DOCUMENTS

JP 10-323930 12/1998
JP 11-198271 7/1999
(Continued)

OTHER PUBLICATIONS

English machine translation of JP2002067200 (original disclosed in IDS, in parent U.S. Appl. No. 16/625,832) (Year: 2002).*
(Continued)

*Primary Examiner* — Scott W Dodds
(74) *Attorney, Agent, or Firm* — Wenderoth, Lind & Ponack, L.L.P.

(57) ABSTRACT

[Problems] Provided is a discoloring body which is discolored by application of water and has high glossiness and is excellent in applicability to various fields such as a toy field, a decoration field, and a design field.

[Solution] A discoloring body including a supporting body, a porous layer in which a low refractive index pigment is fixed in a dispersed state by way of a binder resin, and a glossy resin layer, in which an occupancy area ratio of the glossy resin layer is 1% to 95% with respect to a 1 cm square at any position in the porous layer.

8 Claims, 1 Drawing Sheet

(30) Foreign Application Priority Data

Apr. 25, 2018 (JP) ................................. 2018-084506
Apr. 25, 2018 (JP) ................................. 2018-084507

(51) Int. Cl.
*B32B 7/12* (2006.01)
*B32B 37/00* (2006.01)
*C08J 5/12* (2006.01)
*C08J 5/18* (2006.01)
*A63H 33/22* (2006.01)
*B44F 1/02* (2006.01)

(52) U.S. Cl.
CPC ............. *B41J 2/0057* (2013.01); *C08J 5/124* (2013.01); *C08J 5/18* (2013.01); *A63H 33/22* (2013.01); *B32B 2307/4026* (2013.01); *B32B 2307/406* (2013.01); *B32B 2307/414* (2013.01); *B32B 2307/732* (2013.01); *B32B 2451/00* (2013.01); *B44F 1/02* (2013.01); *Y10T 428/24909* (2015.01)

(56) References Cited

U.S. PATENT DOCUMENTS

2002/0150737 A1 10/2002 Nakashima
2003/0228450 A1* 12/2003 Burch .................. B41M 7/0027 428/32.6
2005/0014444 A1 1/2005 Harata et al.
2006/0013632 A1* 1/2006 Shimomura ....... B41M 5/38257 400/120.02
2006/0166822 A1 7/2006 Senga et al.

FOREIGN PATENT DOCUMENTS

JP 2000-108521 4/2000
JP 2000-135772 5/2000
JP 2002-67200 3/2002
JP 2004-121698 4/2004
JP 2004-243656 9/2004
JP 2004-290663 10/2004
JP 2004-351840 12/2004
JP 2006-116889 5/2006
JP 2007-030345 2/2007
JP 2009-119611 6/2009
JP 2009-184209 8/2009
JP 2011-88392 5/2011
JP 2015-178268 10/2015
JP 2018-43449 3/2018

OTHER PUBLICATIONS

English machine translation of JP2009184209 (original disclosed in IDS, in parent U.S. Appl. No. 16/625,832) (Year: 2009).*
International Search Report (ISR) issued Sep. 25, 2018 in International (PCT) Application No. PCT/JP2018/023980.
International Preliminary Report on Patentability issued Jan. 9, 2020 in International (PCT) Application No. PCT/JP2018/023980.
Extended European Search Report issued Feb. 25, 2021 in corresponding European Application No. 18824032.9.
Office Action issued Nov. 1, 2021 in corresponding Chinese Patent Application No. 201880043498.6 with English translation.
Notice of Reasons for Refusal issued Feb. 4, 2022 in corresponding Japanese Patent Application No. 2019-526880, with English Machine Translation.
European Office Action issued Jan. 22, 2024 in corresponding European Patent Application No. 18 824 032.9.
Office Action issued Feb. 26, 2024 in Chinese Patent Application No. 201880043498.6, with English translation.
Jiang Gu & Zhu Yuchuan eds., "Flexible Packaging Printing and Post-Processing Technology", Printing Industry Press, 2007, pp. 302-303, with English translation.
Office Action issued May 9, 2024 in Chinese Patent Application No. 201880043498.6, with English-language Translation.
Machine translation of JP 2015-178268 via EPO (Year: 2015).
Longobucco, Alyssa. "Weekend Project! DIY Waterproof Coasters", https://www.self.com/story/diy-waterproof-coasters; Apr. 19, 2013 (Year: 2013).
Machine translation of JP 2004-243656 via EPO (Year: 2004).
Machine translation of JP 2000-108521 via EPO (Year: 2000).
Machine translation of JP H 10323930 via EPO (Year: 1998).
Machine translation of JP 2004-121698 via EPO (Year: 2004).
"Moon and Star Constellation Coasters DIY", https://www.runningwithagluegunstudio.com/2014/06/moon-and-star-constellation-coasters-diy.html (Year: 2014).
"DIY Painted Cork Coasters", https://www.sarahhearts.com/painted-cork-coasters/ (Year: 2013).
"DIY Scrabble Coasters with Glitter", https://taylorbradford.com/diy-scrabble-coasters-glitter/ (Year: 2016).
Machine translation of JP 2007-030345 via EPO (Year: 2007).
Machine translation of JP 2009-119611 via EPO (Year: 2009).
Machine translation of JP 2002-067200 via EPO (Year: 2002).
Machine translation of JP 2006-116889 via EPO (Year: 2006).
Machine translation of JP 2004-351840 via EPO (Year: 2004).

* cited by examiner

[FIG. 1]
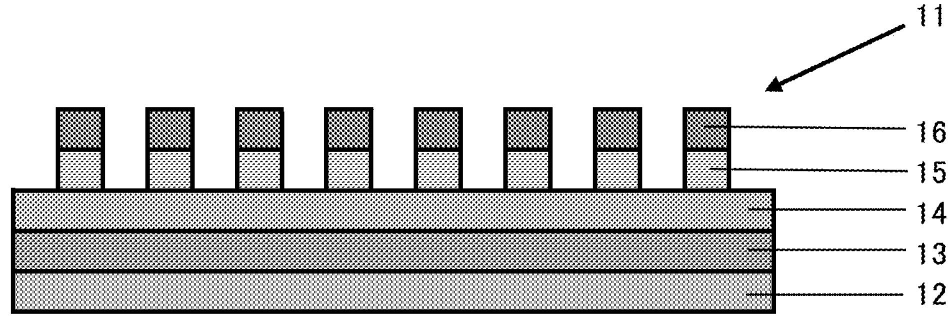
[FIG. 2]
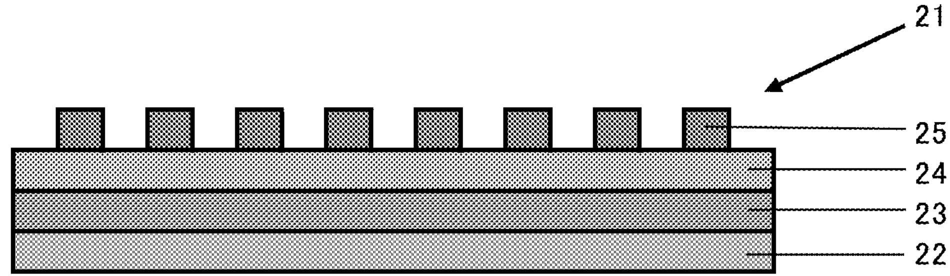

METHOD FOR PRODUCING DISCOLORING BODY

CROSS-REFERENCE TO RELATED APPLICATIONS

This application is a divisional application of U.S. patent application Ser. No. 16/625,832, filed on Dec. 23, 2019, which is a US national stage application of PCT International Application No. PCT/JP2018/023980, filed on Jun. 25, 2018, and claims priority to Japanese Patent Application Serial No. 2018-084507 (filed on Apr. 25, 2018), Japanese Patent Application Serial No. 2018-084506 (filed on Apr. 25, 2018), Japanese Patent Application Serial No. 2017-127460 (filed on Jun. 29, 2017), and Japanese Patent Application Serial No. 2017-127459 (filed on Jun. 29, 2017), the contents of which are hereby incorporated by reference in their entirety.

TECHNICAL FIELD

The present invention relates to a discoloring body having glossiness. Furthermore, it relates to a discoloring body rich in glossiness which discolors by application of water.

BACKGROUND ART

In the related art, a discolorable laminate including a supporting body and a porous layer in which a low refractive index pigment is fixed in a dispersed state with a binder resin has been disclosed. This porous layer is made transparent by absorbing liquid such as water and has excellent concealability in a dry state and transparency in a liquid absorption state, and thus, the discolorable laminate can realize enjoyable color change due to adhesion of water (for example, Patent Literature 1).

In this discolorable laminate, since the porous layer is located on the surface, it is difficult to express glossiness.

Further, there is disclosed a discolorable laminate including a supporting body, a porous layer in which a low refractive index pigment is fixed in a dispersed state by way of a binder resin, and a plurality of brilliant fine pieces fixed on the porous layer. In this case, it is possible to realize enjoyable color change due to the adhesion of water and to visually recognize the brilliance due to the brilliant fine pieces (for example, Patent Literature 2).

In this discolorable laminate, it was difficult to peel off the brilliant fine pieces by rubbing, or difficult to exhibit uniform brilliance of the surface due to the overlapping of the brilliant fine pieces.

CITATION LIST

Patent Literature

Patent Literature 1: JP 11-198271 A
Patent Literature 2: JP 2002-67200 A

SUMMARY OF INVENTION

Technical Problem

The present invention is to provide a discoloring body that can realize enjoyable color change due to adhesion of water and has high glossiness. The present invention is to further provide a discoloring body that maintains glossiness and has durability against scratching with a finger or the like, even when the color change is repeated.

Solution to Problem

The present invention includes a supporting body, a porous layer in which a low refractive index pigment is fixed in a dispersed state by way of a binder resin, a glossy resin layer formed on the porous layer and selected from a brilliant resin layer or a translucent resin layer, in which an occupancy area ratio of the glossy resin layer is 1% to 95% with respect to a 1 cm square at any position in the porous layer.

Advantageous Effects of Invention

According to the present invention, there is provided a discoloring body which discolors due to the application of water, maintains glossiness and has durability against scratching with a finger or the like, even when the color change is repeated, and also excellent in applicability to various fields such as a toy field, a decoration field, and a design field.

BRIEF DESCRIPTION OF DRAWINGS

FIG. 1 is a longitudinal cross-sectional explanatory view of an example of a discoloring body including a brilliant resin layer according to the present invention.

FIG. 2 is a longitudinal cross-sectional explanatory view of an example of a discoloring body including a translucent resin layer according to the present invention.

DESCRIPTION OF EMBODIMENTS

The discoloring body according to the present invention has a structure in which a supporting body, a porous layer, and a glossy resin layer are laminated. Here, the porous layer can be formed on the entire surface of the supporting body, and the glossy resin layer can be formed on the entire surface of the porous layer, and in order to facilitate manufacture, or to design images and characters that can be expressed by the discoloring body, the porous layer or the glossy resin layer can be formed on a part of the surface of the supporting body. In the present invention, the "discoloring body" means a structure having a structure in which the supporting body, the porous layer, and the glossy resin layer are laminated. In the case where the porous layer or the glossy resin layer is formed on the part of the surface of the supporting body, a portion having a structure in which the supporting body, the porous layer, and the glossy resin layer are laminated is defined as a discoloring body. However, in this case, the "discoloring body" and other parts are integrally formed via the supporting body, and therefore, the "discoloring body" including the part that does not have a laminated structure may be referred to for convenience.

The supporting body is effective if it is a material having printability, for example, paper, synthetic paper, fabrics (such as woven fabric, knitted fabric, braided fabric, or non-woven fabric), natural or synthetic leather, plastic, glass, ceramics, metal, wood, and stone are used. Moreover, the supporting body is preferably formed into a planar shape, and also may be formed into an uneven shape.

The porous layer is a layer in which a low refractive index pigment is fixed in a dispersed state by way of a binder resin, and is a layer having different transparency depending on a dry state and a liquid absorption state.

Examples of the low refractive index pigment include silicic acid and a salt thereof, barite powder, barium sulfate, barium carbonate, calcium carbonate, gypsum, clay, talc, alumina white, and magnesium carbonate, and these have a refractive index in a range of 1.4 to 1.8, and exhibit excellent transparency when water is absorbed.

Examples of the salt of silicic acid include aluminum silicate, potassium aluminum silicate, sodium aluminum silicate, aluminum calcium silicate, potassium silicate, calcium silicate, sodium calcium silicate, sodium silicate, magnesium silicate, and potassium magnesium silicate.

In addition, silicic acid is mentioned as the low refractive index pigment used suitably.

Two or more low refractive index pigments can be used in combination.

The particle diameter of the low refractive index pigment is not particularly limited, and those having a particle size of 0.03 to 10.0 μm are preferably used.

The silicic acid may be silicic acid produced by a dry method, but silicic acid produced by a wet method (hereinafter, referred to as wet-type silicic acid) is particularly effective. To explain this point, silicic acid is produced as amorphous silicic acid, depending on the production method, it is roughly divided into the dry method using a gas phase reaction such as thermal decomposition of silicon halide such as silicon tetrachloride (hereinafter, referred to as dry-type silicic acid) and the wet method using a liquid phase reaction such as decomposition by acid such as sodium silicate. The structure differs between the dry-type silicic acid and the wet-type silicic acid such that the dry-type silicic acid forms a three-dimensional structure in which silicic acid is closely bound; whereas the wet-type silicic acid has a so-called two-dimensional structure part in which the silicic acid is condensed to form a long molecular arrangement.

Therefore, since the molecular structure is rough compared to the dry-type silicic acid, in a case where the wet-type silicic acid is applied to the porous layer, it is presumed that it is superior in the diffused reflection of light in the dry state compared to a case of using the dry-type silicic acid, and the concealability in a normal state is increased.

In addition, since the porous layer absorbs water, the wet-type silicic acid has many hydroxyl groups present as silanol groups on the particle surface and has a high degree of hydrophilicity as compared with the dry-type silicic acid, and thus is preferably used.

Note that, in order to adjust the concealability in the normal state of the porous layer and the transparency in the liquid absorption state, other low refractive index pigments can be used in combination with the wet-type silicic acid.

The low refractive index pigment in the porous layer depends on properties such as a particle diameter, a specific surface area, and oil absorption, but in order to satisfy both the concealability in the normal state and the transparency in the liquid absorption state, the amount applied is preferably 1 to 30 g/m$^2$, and more preferably 5 to 20 g/m$^2$. If the amount applied is less than 1 g/m$^2$, it is difficult to obtain sufficient concealability in a normal state, and if it exceeds 30 g/m$^2$, it is difficult to obtain sufficient transparency upon liquid absorption.

The low refractive index pigment is dispersed in a vehicle containing a binder resin as a binder, and applied on the supporting body, and then a volatile matter is dried to form a porous layer.

Examples of the binder resin include a urethane resin, a nylon resin, a vinyl acetate resin, an acrylic ester resin, an acrylic ester copolymer resin, an acrylic polyol resin, a vinyl chloride-vinyl acetate copolymer resin, a maleic resin, a polyester resin, a styrene resin, a styrene copolymer resin, a polyethylene resin, a polycarbonate resin, an epoxy resin, a styrene-butadiene copolymer resin, an acrylonitrile-butadiene copolymer resin, a methyl methacrylate-butadiene copolymer resin, a butadiene resin, a chloroprene resin, a melamine resin, and each of the above resin emulsion, casein, starch, a cellulose derivative, polyvinyl alcohol, a urea resin, and a phenol resin.

A mixing ratio of the low refractive index pigment and the binder resin depends on the type and properties of the low refractive index pigment, and is preferably 0.5 to 2 parts by mass of the binder resin solid content with respect to 1 part by mass of the low refractive index pigment, and more preferably 0.8 to 1.5 parts by mass. In a case where the binder resin solid content is less than 0.5 parts by mass with respect to 1 part by mass of the low refractive index pigment, it is difficult to obtain a practical film strength of the porous layer, and when it exceeds 2 parts by mass, water permeability into the porous layer is easily impaired.

Since the porous layer has a smaller mixing ratio of the binder resin to a coloring agent than a general coating film, it is difficult to obtain sufficient film strength. Therefore, in order to increase the scratch resistance, it is effective to use a nylon resin or a urethane resin among the binder resins.

Examples of the urethane resin include a polyester urethane resin, a polycarbonate urethane resin, and a polyether urethane resin, and two or more types thereof can be used in combination. Also, a urethane emulsion resin in which a resin is emulsified and dispersed in water, or a colloidal dispersion type (ionomer type) urethane resin in which a resin is self-emulsified without a need for an emulsifier due to an ionic group of an ionic urethane resin (urethane ionomer) and dissolved or dispersed in water can also be used.

As the urethane resin, either a water-based urethane resin or an oil-based urethane resin can be used, but the water-based urethane resin, particularly a urethane emulsion resin or a colloidal dispersion type urethane resin is preferably used.

The urethane resin can be used alone, but other binder resins can be used in combination depending on the performance required for the coating. When the binder resin other than the urethane resin is used in combination, it is preferable to contain 30% or more of the urethane resin in the solid content mass ratio in the binder resin of the porous layer in order to obtain practical film strength.

In the binder resin, a crosslinkable resin can be further improved in the film strength by adding any crosslinking agent for crosslinking.

The binder resin has large or small affinity with water, and by combining these, a penetration time into the porous layer, a degree of penetration, and a slow speed of drying after the penetration can be adjusted. Furthermore, adjustment can be controlled by adding a dispersant or a surfactant as appropriate.

The porous layer can be formed on the supporting body by printing means such as screen printing, offset printing, gravure printing, coater, tampo printing, and transfer, brush coating, spray coating, electrostatic coating, electrodeposition coating, flow coating, roller coating, and dip coating.

In addition, in the porous layer, a coloring agent can be added to color the porous layer in a dry state, or a colored image containing the coloring agent can be provided on the porous layer to indicate a complicated aspect change. Examples of the coloring agent include a general dye, a general pigment, a fluorescent dye, a fluorescent pigment, a metallic luster pigment, a reversible thermochromic composition, a reversible thermochromic microcapsule pigment containing the reversible thermochromic composition, a photochromic composition, and a photochromic microcapsule pigment containing the photochromic composition. When using the fluorescent coloring agent such as a fluorescent dye and a fluorescent pigment, it provides excellent color change clarity, and when using a thermochromic coloring agent such as a reversible thermochromic composition or a reversible thermochromic microcapsule pigment containing the reversible thermochromic composition, and a photochromic coloring agent such as a photochromic coloring agent, a photochromic composition, and a photochromic pigment containing the photochromic composition, various variability can be imparted. As the reversible thermochromic composition, a reversible thermochromic composition containing three components of an electron donating colorable organic compound, an electron accepting compound, and an organic compound medium that reversibly causes a color reaction is suitably used. As the photochromic composition, a photochromic compound such as a spirooxazine compound, a spiropyran compound, and a diarylethene compound are preferably used.

A colored layer can be provided between the supporting body and the porous layer. The colored layer is formed of a binder resin containing a coloring agent. Examples of the coloring agent include a general dye, a general pigment, a fluorescent pigment, a metallic luster pigment, and a reversible thermochromic microcapsule pigment containing a reversible thermochromic composition.

The coloring agent is formed by applying an ink or paint contained in a vehicle containing a binder resin as a binder to a supporting body, and then drying the volatile matter to form a colored layer. Examples of the binder resin include a urethane resin, a nylon resin, a vinyl acetate resin, an acrylic ester resin, an acrylic ester copolymer resin, an acrylic polyol resin, a vinyl chloride-vinyl acetate copolymer resin, a maleic resin, a polyester resin, a styrene resin, a styrene copolymer resin, a polyethylene resin, a polycarbonate resin, an epoxy resin, a styrene-butadiene copolymer resin, an acrylonitrile-butadiene copolymer resin, a methyl methacrylate-butadiene copolymer resin, a butadiene resin, a chloroprene resin, a melamine resin, and each of the above resin emulsion, casein, starch, a cellulose derivative, polyvinyl alcohol, a urea resin, and a phenol resin.

The colored layer is formed on the supporting body by printing means such as screen printing, offset printing, gravure printing, coater, tampo printing, and transfer, brush coating, spray coating, electrostatic coating, electrodeposition coating, flow coating, roller coating, and dip coating.

In addition, a transfer layer is provided by applying ink or paint contained in a vehicle containing a coloring agent and a binder resin as a binder in advance on another base material, and the transfer layer is transferred onto the supporting body to provide a colored layer.

Note that, in the colored layer, by using a plurality of coloring agents having different colors to make a multicolored pattern or design, a colorful pattern by the colored layer can be visually recognized, so that the merchantability can be improved. Furthermore, in a case where the support has transparency, a colored layer can be provided on a back surface (a surface on which the porous layer is not provided) of the supporting body.

A glossy resin layer is partially provided on the porous layer. In the present invention, a brilliant resin layer or a translucent resin layer is employed as the glossy resin layer.

Here, in the present invention, the glossiness means a property that an interface of an object is shined and visually recognized by reflection, and has a concept including brilliance and translucency.

In the present invention, the term “brilliance” refers to the property of the interface that specularly reflects light. In the present invention, the brilliant resin layer is not limited to one in which the interface simply reflects light, but also includes a resin layer in which a substance that reflects the surface is dispersed. Specific examples of the brilliant resin layer include a resin layer containing a pigment, an iris layer, a hologram layer, and a transparent hologram layer described below.

The translucent resin layer is a layer other than the brilliant resin layer, and means a layer that exhibits glossiness by allowing light to pass through and reflect on the interface.

The glossy resin layer can be formed on the entire surface of the porous layer and has glossiness. Such a discoloring body can express a character and a pattern with high glossiness on a portion wetted with water by drawing a character or a pattern on the surface of the discoloring body with a paintbrush containing water.

Also, the glossy resin layer can be formed into various shapes having a size that can be visually recognized, such as humans, animals, plants, fruits, foodstuffs, vehicles, buildings, and celestial bodies, in addition to various characters, symbols, figures, and patterns. The pattern may be an independent discontinuous pattern such as a polka dot pattern (dot pattern) or a partially connected continuous pattern such as a lattice pattern. Such a discoloring body can draw a character and a pattern similar to the case where the glossy resin layer is uniformly formed.

First, a case where the glossy resin layer is a brilliant resin layer will be described. In the present invention, the brilliant resin layer does not completely cover the entire porous layer. In the present invention, the brilliant resin layer has glossiness in a dry state by being positioned on the porous layer. Furthermore, the moisture supplied to the surface of the discoloring body penetrates into the porous layer, a refractive index of the porous layer changes, and the color and pattern under the porous layer can be visually recognized. In addition, gloss and color of the brilliant resin layer can be combined to create a new aesthetic. That is, the glossiness also caused by the brilliant resin layer in the dry state changes to glossiness that gives another aesthetic after moisture absorption. Therefore, the brilliant resin layer is not a completely continuous layer, but has a structure including through-holes for allowing moisture to permeate or a structure including a large number of separated island-shaped portions. Typically, it has a structure in which an infinite number of fine island-shaped portions having a size that cannot be visually recognized, for example, sub-millimeter order or less, are arranged. Accordingly, the occupancy area ratio of the brilliant resin layer to the porous layer is less than 100%. Since the size of the through-holes or island-shaped portions constituting the brilliant resin layer may have a distribution, the occupancy area ratio of the brilliant resin layer to the porous layer may vary depending on the portion of the porous layer.

In the present invention, the occupancy area ratio of the brilliant resin layer is 1% to 95%, preferably 5% to 95%, more preferably 10% to 95%, and most preferably 20% to 95%, with respect to a 1 cm square at any position in the porous layer. Here, the porous layer is considered for the portion where the brilliant resin layer is formed. By satisfying the above-described range, the glossiness is excellent, the brilliance is uniform, the durability of a brilliance effect is excellent, and a clear discoloring effect can be exhibited when water is adhered.

In a case where the brilliant resin layer has a pattern formed of a small island-shaped portion that cannot be visually recognized, when the occupancy ratio of the brilliant resin layer is 1% to 95% with respect to a 1 mm square at any position in the porous layer, it has uniform brilliance and can exhibit a discoloring effect when water is adhered.

Here, in the present invention, the "occupancy area ratio of the brilliant resin layer with respect to 1 cm square at any position of the porous layer" means an area ratio of a portion where the brilliant resin layer is formed in a 1 cm square are at any position on the surface on the side (in a case where another layer enters between the porous layer and the brilliant resin layer, the side in contact with another layer) of the porous layer in contact with the brilliant resin layer. The occupied area refers to an area in which the brilliant resin layer is vertically projected on the porous layer. Here, "any" means being randomly selected. In other words, in the present invention, the above-mentioned exclusive area ratio is satisfied no matter where on the porous layer is 1 cm square. However, since the discoloring body according to the present invention is a portion in which the supporting body, the porous layer, and the glossy resin layer are laminated, for example, the portion having no glossy resin layer on the porous layer may be 1 cm square or more.

Further, in the present invention, the "occupancy area ratio of the brilliant resin layer with respect to a 1 mm square at any position in the porous layer" is targeted to 1 mm square, which is smaller than the above 1 cm square.

The same applies to the following translucent resin layers.

Further, in a case where the brilliant resin layer has translucency, the occupancy area ratio of the brilliant resin layer is preferably 5% to 95%, more preferably 10% to 95%, and still more preferably 20% to 95%, with respect to a 1 cm square at any position in the porous layer. With this area ratio, when water is adhered to the surface of the discoloring body, the water penetrates the portion where the brilliant resin layer is not formed, and the water also penetrates the porous layer located under the brilliant resin layer so that the entire porous layer is transparent and discolored, and the color change is visible through the translucent brilliant resin layer, which can satisfy the uniform brilliance and the discoloring effect when water is adhered.

Further, in a case where the brilliant resin layer does not have translucency, the occupancy area ratio of the brilliant resin layer is preferably 5% to 80%, more preferably 10% to 80%, and still more preferably 20% to 70%, with respect to a 1 cm square at any position in the porous layer. With this area ratio, when water is adhered from the surface of the discoloring body, the porous layer of the part where the brilliant resin layer is not formed becomes transparent and discolored, and the part provided with the brilliant resin layer is not discolored, which can satisfy the uniform brilliance and the discoloring effect when water is adhered.

Here, "having translucency" means being light transmissive and having many light reflections on the interface. The visual discoloring effect varies depending on transmittance or reflectance of light, and is appropriately adjusted according to the required visual effect. Therefore, the transmittance and reflectance of the light are not necessarily specified. Generally, "having translucency" can be said in a case where the average transmittance in the visible light area, specifically in the area having a wavelength of 400 to 800 nm is 20% or more, and preferably 30% or more, and the average reflectance is 1% or more, and preferably 5% or more.

Examples of the brilliant resin layer include a resin layer having transparent metallic glossiness coated with a transparent metallic glossy pigment (for example, a pearl pigment in which the surface of a transparent core material such as natural mica, synthetic mica, glass pieces, and alumina is coated with a metal oxide such as titanium oxide) and a binder resin, an iris layer, a hologram layer, and a transparent hologram layer.

Examples of the iris layer include a layer obtained by forming a thin film layer of a transparent metal compound (for example, titanium oxide, silicon oxide, zinc oxide, cadmium sulfide, magnesium fluoride, and cerium fluoride) having a refractive index different from the base material by 0.05 or more on a base material surface and laminating in the order of an uneven transparent resin layer with a difference in refractive index of 0.05 or more from the thin film, and a layer obtained by laminating transparent plastic thin films having different refractive indexes in multiple layers.

Examples of the hologram layer and the transparent hologram layer include those in which a light reflecting layer is provided by depositing a metal such as Al, Cr, Ni, Sn, Fe, Co, Cu, Pb, Sb, Mg, Cd, and Bi on at least one surface of a fine uneven pattern.

Further, the brilliant resin layer having a thickness of 0.1 to 20 μm is preferably used. The thickness is more preferably 0.5 to 10 μm, and still more preferably 0.5 to 5 μm. By providing a thin and highly flexible brilliant resin layer, a flexible discoloring body can be obtained. Furthermore, by using a flexible material such as a fabric as the supporting body, the discoloring body can have flexibility.

In the brilliant resin layer, a transfer sheet in which the brilliant resin layer is laminated on a base material having releasability is placed on the porous layer, is bonded to the porous layer by thermocompression bonding at a temperature higher than the softening point of the binder resin of the porous layer, or is bonded to the porous layer by thermocompression bonding at a temperature higher than the softening point of the resin in the brilliant resin layer.

Examples of the base material having the releasability include those in which a release agent, as a main component, such as a silicone resin, an acrylic resin, a cellulose resin, an acrylic resin, an amino alkyd resin, a vinyl acetate resin, a cellulose acetate resin, a urethane resin, a melamine resin, an epoxy resin, a urea-melamine resin, a benzoguanamine resin, and a paraffin wax is applied to or impregnated, or incorporated on the surface of a polyethylene terephthalate film, a polypropylene film, a polycarbonate film, a polystyrene film, a polyamide film, a polyamideimide film, a polyethylene film, a polyvinyl chloride film, a cellulose acetate film, cellophane paper, glassine paper, and paper.

In the discoloring body produced using the transfer sheet, although the release layer of the base material may remain on the brilliant resin layer, since the release layer does not hinder the brilliance, it may be left as it is.

Moreover, the brilliant resin layer can also be formed by being bonded to a porous layer through the adhesive resin layer, and then removing the base material. The adhesive resin layer may be formed on the porous layer in advance, but the adhesive resin layer may be provided by applying an adhesive to the brilliant resin layer when the supporting body and the transfer sheet are joined, or the adhesive resin layer may be provided by causing the adhesive resin layer such as a heat-meltable resin to be interposed for thermocompression bonding when the supporting body and the transfer sheet are joined. With the adhesion method as described above, the adhesion performance of the brilliant resin layer is improved, the friction resistance is excellent, and the durability of the brilliance effect can be further improved.

Next, a case where the glossy resin layer is a translucent resin layer will be described. The translucent resin layer is obtained by being formed of a material as described below, and is generally a resin layer having translucency as described above.

The occupancy area ratio of the translucent resin layer is 1% to 95%, preferably 10% to 95%, more preferably 20% to 95%, and most preferably 30% to 95%, with respect to a 1 cm square at any position in the porous layer. By satisfying the above-described range, the glossiness is excellent, and when water is adhered, water penetrates to the part where the translucent resin layer is not formed, the porous layer becomes transparent by liquid absorption, and thereby the clear discoloring effect can be exhibited.

In a case where the translucent resin layer has a pattern formed of a small island-shaped portion that cannot be visually recognized, when the occupancy area ratio of the translucent resin layer is 1% to 95% with respect to a 1 mm square at any position in the porous layer, it has uniform translucency and can exhibit the discoloring effect when water is adhered.

Examples of translucent resin layer include those formed of a thermosetting resin such as an acrylic resin, an epoxy resin, an epoxy-acrylate resin, a urethane resin, an ethylene resin, a urethane-acrylic resin, a melamine resin, a phenol resin, a urea resin, a urea-melamine resin, a diallyl phthalate resin, an ester resin, an alkyd resin, a maleated rosin, a vinyl butyral resin, a cellulose resin, an amide resin, a two-component curable resin, an ultraviolet light curable resin, and an electron beam curable resin.

A thickness of the translucent resin layer is preferably 0.5 to 20 μm. The thickness is more preferably 0.5 to 10 μm, and still more preferably 0.5 to 5 μm. By providing a thin and highly flexible translucent resin layer, a flexible discoloring body can be obtained. Furthermore, by using a flexible material such as a fabric as the supporting body, the discoloring body can have flexibility.

The translucent resin layer may be formed directly on the porous layer, but the transfer sheet provided with the translucent resin layer by applying the translucent resin on the base material having releasability is joined with the porous layer, and after heat-sealing, the base material can be removed to obtain a discoloring body. Examples of the base material having the releasability are the same as in the case of the brilliant resin layer. In addition, in the discoloring body produced using the transfer sheet, although the release layer of the base material may remain on the translucent resin layer, since the release layer does not hinder the glossiness, it may be left as it is.

Moreover, the translucent resin layer can also be formed by being bonded to a porous layer through the adhesive resin layer, and then removing the base material. The adhesive resin layer may be formed on the porous layer in advance, but the adhesive resin layer may be provided by applying an adhesive to the translucent resin layer when the supporting body and the transfer sheet are joined, or the adhesive resin layer may be provided by causing the adhesive resin layer such as a heat-meltable resin to be interposed for thermo-compression bonding when the supporting body and the transfer sheet are joined. With the adhesion method as described above, the adhesion performance of the translucent resin layer is improved, the friction resistance is excellent, and the durability can be further improved.

Furthermore, a protective layer can be provided on the translucent resin layer. This protective layer may be a translucent protective layer formed of the same material as the translucent resin layer and having a translucency. It is also possible to improve the durability of the translucent resin layer by providing the translucent protective layer having glossiness.

In the present invention, the translucent protective layer, similar to the translucent resin layer, reflects light and has glossiness, and is mainly intended to protect the translucent resin layer.

Specific embodiments of the discoloring body according to the present invention include, for example, doll costumes such as stuffed animals, dolls, and doll dresses, doll accessories such as puppets, water gun targets, animal models, toys such as boards, which show traces of handprints and footprints humans and dolls, teaching tools such as water brush sheets, clothing such as dresses, swimsuits, shoes, bags, furniture, and artificial flowers. It can also be applied as various indicators, for example, detection of liquid leaks in pipes, pipes, water tanks, tanks, or he like, detection of water wetting in personal items and furniture, detection of water wetting in transport of non-water-based chemicals and storage location, detection of condensation, detection of urine of disposable diapers, and detection of moisture in soil. Furthermore, it also can be applied to an umbrella whose pattern or color changes when it rains, and an outdoor banner, a road sign, or a wall of a building whose display changes when it rains.

As means for adhering water to the discoloring body according to the present invention, causing the discoloring body to be immersed directly in water or to be contact with water via wet hands and fingers, and applying a water adhering tool can be exemplified. Examples of the water adhering tool include a water gun, a sprayer, a writing or painting tool having a brush or a fiber pen body at the tip, a writing or painting tool having a fiber body or a brush that contains water in the container and derives the water in the container, and a stamp tool. As the water adhering tool, the writing or painting tool applied with a plastic porous body having continuous pores or fiber processed body as a pen tip member can easily form a writing image and thus can improve practicality. In addition, a discoloring body set can also be configured by combining the water adhering tool and the discoloring body according to the present invention.

EXAMPLES

Examples are described below, but the present invention is not limited thereto.

In addition, "part" in examples indicates "part by mass".

First, examples of a discoloring body in which a glossy resin layer is a brilliant resin layer will be described.

Example 101 (refer to FIG. 1)

On a white T/C (65/35) broad fabric (weight per unit area: 120 g/cm$^2$) as a supporting body 12, a colored layer 13 was formed by solid printing on the entire surface using a pink non-discoloring ink. Next, on the colored layer 13, a solid print was performed on the entire surface with a 100-mesh screen plate using a white screen printing ink obtained by uniformly mixing and stirring 15 parts of wet-type silicic acid (trade name: NIPSIL E-200, produced by Nippon Silica Industry Co., Ltd.), 30 parts of urethane emulsion (trade name: Hydran HW-930, produced by DIC CORPORATION) (50% solid content), 40 parts of water, 0.5 parts of silicone antifoam, 3 parts of thickener for water-based ink, 1 part of ethylene glycol, and 3 parts of blocked isocyanate cross-linking agent, and the solid-printed plates was dried and cured at 130° C. for 5 minutes to form a porous layer 14. Separately from this, on the release sheet made of a 25 μm thick polyethylene terephthalate resin film coated with a silicone resin on the surface, a translucent brilliant resin layer with a thickness of 1.0 μm, in which an acrylic resin and a polyester resin were laminated together, was provided, and a transparent hot-melt adhesive made of a polyurethane resin was applied on the brilliant resin layer to provide an adhesive resin layer 15 having a dot shape with a diameter of 1.5 mm, thereby obtaining a transfer sheet. After joining the adhesive resin layer and the porous layer of the transfer sheet, and pressing and bonding them with a roll heated to 110° C., the release sheet was peeled off to provide the brilliant resin layer 16 having a dot shape on the porous layer, thereby obtaining a discoloring body 11 of Example 101.

In the discoloring body of Example 101, the occupancy area ratio of the brilliant resin layer was 10% with respect to a 1 cm square at any position in the porous layer.

In the discoloring body of Example 101, in a dry state, a dot pattern having irisiness due to the brilliant resin layer was visually recognized on a white fabric. When water was adhered on the porous layer, the water penetrated into a part of the porous layer where the brilliant resin layer was not formed and the porous layer became transparent, and the porous layer located below the brilliant resin layer also became transparent due to the water penetration, and therefore, the part where the brilliant resin layer was not formed and the part where the brilliant resin layer was formed were discolored to pink, and the pink dot pattern having irisiness was visually recognized. Although the state where the water was adhered indicated the above-mentioned aspect, gradually, the pink visually disappeared as the water dried, and it returned to the original white again when it was completely dried. This aspect change was able to be repeated, and had uniform brilliance in both the dry state and the water absorption state.

Further, even when the brilliant resin layer was rubbed with a finger, the brilliance was maintained without being lost.

Example 102

On a white T/C (65/35) broad fabric (weight per unit area: 120 g/cm$^2$) as a supporting body, a colored layer having a wave pattern (band-shaped colored image) in which bent band-shaped images having a width of 1 cm were arranged adjacent to each other was formed using four non-discoloring inks of pink, orange, blue, and light green. Next, on the colored layer, a solid print was performed on the entire surface with a 100-mesh screen plate using a white screen printing ink obtained by uniformly mixing and stirring 15 parts of wet-type silicic acid (trade name: NIPSIL E-200, produced by Nippon Silica Industry Co., Ltd.), 30 parts of urethane emulsion (trade name: Hydran HW-930, produced by DIC CORPORATION) (50% solid content), 40 parts of water, 0.5 parts of silicone antifoam, 3 parts of thickener for water-based ink, 1 part of ethylene glycol, and 3 parts of blocked isocyanate cross-linking agent, and the solid-printed plates was dried and cured at 130° C. for 5 minutes to form a porous layer. Separately from this, on the release sheet made of a 25 μm thick polyethylene terephthalate resin film coated with a silicone resin on the surface, a translucent brilliant resin layer with a thickness of 1.0 μm, in which an acrylic resin and a polyester resin were laminated together, was provided, and a transparent hot-melt adhesive made of a urethane resin was applied on the brilliant resin layer to provide an adhesive resin layer having a regular hexagonal shape with one side of 1.0 mm, thereby obtaining a transfer sheet. After joining the adhesive resin layer and the porous layer of the transfer sheet, and pressing and bonding them with a roll heated to 110° C., the release sheet was peeled off to provide the brilliant resin layer having a regular hexagonal shape on the porous layer, thereby obtaining a discoloring body of Example 102.

In the discoloring body of Example 102, the occupancy area ratio of the brilliant resin layer was 95% with respect to a 1 cm square at any position in the porous layer.

In the discoloring body of Example 102, in a dry state, a regular hexagonal shape having irisiness due to the brilliant resin layer was visually recognized on a white fabric. When water was adhered on the porous layer, the water penetrated into a part of the porous layer where the brilliant resin layer was not formed and the porous layer became transparent, and the porous layer located below the brilliant resin layer also became transparent due to the water penetration, and therefore, the part where the brilliant resin layer was not formed and the part where the brilliant resin layer was formed were discolored to a wave pattern with pink, orange, blue, and light green, and the wave pattern having irisiness was visually recognized. Although the state where the water was adhered indicated the above-mentioned aspect, gradually, the wave pattern visually disappeared as the water dried, and it returned to the original white again when it was completely dried. This aspect change was able to be repeated, and had uniform brilliance in both the dry state and the water absorption state.

Further, even when the brilliant resin layer was rubbed with a finger, the brilliance was maintained without being lost.

Example 103

On a white polyester taffeta fabric (weight per unit area: 80 g/cm$^2$) as a supporting body, a colored layer was formed by solid printing on the entire surface using a blue non-discoloring ink. Next, on the colored layer, a solid print was performed on the entire surface with a 100-mesh screen plate using a white screen printing ink obtained by uniformly mixing and stirring 15 parts of wet-type silicic acid (trade name: NIPSIL E-200, produced by Nippon Silica Industry Co., Ltd.), 30 parts of urethane emulsion (trade name: Hydran HW-930, produced by DIC CORPORATION) (50% solid content), 40 parts of water, 0.5 parts of silicone antifoam, 3 parts of thickener for water-based ink, 1 part of ethylene glycol, and 3 parts of blocked isocyanate cross-linking agent, and the solid-printed plates was dried and cured at 130° C. for 5 minutes to form a porous layer. Separately from this, on the release sheet made of a 25 μm thick polyethylene terephthalate resin film coated with a cellulose acetate resin on the surface, a translucent brilliant resin layer with a thickness of 10.0 μm, in which an acrylic resin and a pearl pigment, was provided, and a transparent hot-melt adhesive made of an ethylene vinyl acetate resin was applied on the brilliant resin layer to provide an adhesive resin layer having a cracked pattern, thereby obtaining a transfer sheet. After joining the adhesive resin layer and the porous layer of the transfer sheet, and pressing and bonding them with a roll heated to 100° C., the release sheet was peeled off to provide the brilliant resin layer having a cracked pattern on the porous layer, thereby obtaining a discoloring body of Example 103.

In the discoloring body of Example 103, the occupancy area ratio of the brilliant resin layer was 70% with respect to a 1 cm square at any position in the porous layer.

In the discoloring body of Example 103, in a dry state, a cracked pattern having irisiness due to the brilliant resin layer was visually recognized on a white fabric. When water was adhered on the porous layer, the water penetrated into a part of the porous layer where the brilliant resin layer was not formed and the porous layer became transparent, and the porous layer located below the brilliant resin layer also became transparent due to the water penetration, and therefore, the part where the brilliant resin layer was not formed and the part where the brilliant resin layer was formed were discolored to blue, and the blue cracked pattern having irisiness was visually recognized. Although the state where the water was adhered indicated the above-mentioned aspect, gradually, the blue visually disappeared as the water dried, and it returned to the original white again when it was completely dried. This aspect change was able to be repeated, and had uniform brilliance in both the dry state and the water absorption state.

Further, even when the brilliant resin layer was rubbed with a finger, the brilliance was maintained without being lost.

Example 104

On a white T/C (65/35) broad fabric (weight per unit area: 120 g/cm$^2$) as a supporting body, a colored layer was formed by solid printing on the entire surface using a pink non-discoloring ink. Next, on the colored layer, a solid print was performed on the entire surface with a 100-mesh screen plate using a white screen printing ink obtained by uniformly mixing and stirring 15 parts of wet-type silicic acid (trade name: NIPSIL E-200, produced by Nippon Silica Industry Co., Ltd.), 30 parts of urethane emulsion (trade name: Hydran HW-930, produced by DIC CORPORATION) (50% solid content), 40 parts of water, 0.5 parts of silicone antifoam, 3 parts of thickener for water-based ink, 1 part of ethylene glycol, and 3 parts of blocked isocyanate cross-linking agent, and the solid-printed plates was dried and cured at 130° C. for 5 minutes to form a porous layer. Separately from this, on the release sheet made of a 25 μm thick polyethylene terephthalate resin film coated with nitrocellulose resin on the surface, an acrylic resin, zinc sulfide, and silicon oxide were laminated and vapor-deposited on each other to provide a brilliant resin layer having a thickness of 0.5 μm, thereby obtaining a transfer sheet. After joining the brilliant resin layer and the porous layer of the transfer sheet, and pressing and bonding them with a roll heated to 160° C., which is a temperature higher than a softening point of the binder resin of the porous layer, the release sheet was peeled off to provide the brilliant resin layer on the porous layer having a convex portion of the fabric, thereby obtaining a discoloring body of Example 104.

In the discoloring body of Example 104, the occupancy area ratio of the brilliant resin layer was 50% with respect to a 1 cm square at any position in the porous layer.

In the discoloring body of Example 104, in a dry state, a dot pattern having irisiness due to the brilliant resin layer was visually recognized on a white fabric. When water was adhered on the porous layer, the water penetrated into a part of the porous layer where the brilliant resin layer was not formed and the porous layer became transparent, and the porous layer located below the brilliant resin layer also became transparent due to the water penetration, and therefore, the part where the brilliant resin layer was not formed and the part where the brilliant resin layer was formed were discolored to pink, and the pink dot pattern having irisiness was visually recognized. Although the state where the water was adhered indicated the above-mentioned aspect, gradually, the pink visually disappeared as the water dried, and it returned to the original white again when it was completely dried. This aspect change was able to be repeated, and had uniform brilliance in both the dry state and the water absorption state.

Further, even when the brilliant resin layer was rubbed with a finger, the brilliance was maintained without being lost.

Example 105

On a white nylon taffeta fabric (weight per unit area: 80 g/cm$^2$) as a supporting body, a colored layer was formed by solid printing on the entire surface using an orange non-discoloring ink. Next, on the colored layer, a solid print was performed on the entire surface with a 100-mesh screen plate using a white screen printing ink obtained by uniformly mixing and stirring 15 parts of wet-type silicic acid (trade name: NIPSIL E-200, produced by Nippon Silica Industry Co., Ltd.), 30 parts of urethane emulsion (trade name: Hydran HW-930, produced by DIC CORPORATION) (50% solid content), 40 parts of water, 0.5 parts of silicone antifoam, 3 parts of thickener for water-based ink, 1 part of ethylene glycol, and 3 parts of blocked isocyanate cross-linking agent, and the solid-printed plates was dried and cured at 130° C. for 5 minutes to form a porous layer. Separately from this, on the release sheet made of a 25 μm thick polyethylene terephthalate resin film coated with a silicone resin on the surface, a translucent brilliant resin layer with a thickness of 1.0 μm, in which an acrylic resin and a polyester resin were laminated together, was provided, and a transparent hot-melt adhesive made of a polyamide resin was applied on the brilliant resin layer to provide an adhesive resin layer having a dot shape with a diameter of 2.0 mm, thereby obtaining a transfer sheet. After joining the adhesive resin layer and the porous layer of the transfer sheet, and pressing and bonding them with a roll heated to 110° C., the release sheet was peeled off to provide the brilliant resin layer having a dot shape on the porous layer, thereby obtaining a discoloring body of Example 105.

In the discoloring body of Example 105, the occupancy area ratio of the brilliant resin layer was 20% per 1 cm$^2$ with respect to a 1 cm square at any position in the porous layer.

In the discoloring body of Example 105, in a dry state, a dot pattern having irisiness due to the brilliant resin layer was visually recognized on a white fabric. When water was adhered on the porous layer, the water penetrated into a part of the porous layer where the brilliant resin layer was not formed and the porous layer became transparent, and the porous layer located below the brilliant resin layer also became transparent due to the water penetration, and therefore, the part where the brilliant resin layer was not formed and the part where the brilliant resin layer was formed were discolored to orange, and the orange dot pattern having irisiness was visually recognized. Although the state where the water was adhered indicated the above-mentioned aspect, gradually, the orange visually disappeared as the water dried, and it returned to the original white again when it was completely dried. This aspect change was able to be repeated, and had uniform brilliance in both the dry state and the water absorption state.

Further, even when the brilliant resin layer was rubbed with a finger, the brilliance was maintained without being lost.

Example 106

On a white T/C (65/35) broad fabric (weight per unit area: 120 g/cm$^2$) as a supporting body, a colored layer was formed by solid printing on the entire surface using a pink non-discoloring ink. Next, on the colored layer, a solid print was performed on the entire surface with a 100-mesh screen plate using a white screen printing ink obtained by uniformly mixing and stirring 15 parts of wet-type silicic acid (trade name: NIPSIL E-200, produced by Nippon Silica Industry Co., Ltd.), 30 parts of urethane emulsion (trade name: Hydran HW-930, produced by DIC CORPORATION) (50% solid content), 40 parts of water, 0.5 parts of silicone antifoam, 3 parts of thickener for water-based ink, 1 part of ethylene glycol, and 3 parts of blocked isocyanate cross-linking agent, and the solid-printed plates was dried and cured at 130° C. for 5 minutes to form a porous layer. Next, the hot-melt adhesive made of a polyolefin resin was applied on the porous layer to provide an adhesive resin layer made of a line drawing canvas pattern. Separately from this, on the release sheet made of a 25 μm thick polyethylene terephthalate resin film coated with a silicone resin on the surface, a transparent polyester resin layer was provided, and an aluminum vapor deposition layer was formed after embossing to obtain a transfer sheet. After joining the aluminum vapor deposition layer and the adhesive resin layer of the transfer sheet, and pressing and bonding them with a roll heated to 110° C., the release sheet was peeled off to provide the holographic brilliant resin layer having a line drawing canvas pattern on the porous layer, thereby obtaining a discoloring body of Example 106.

In the discoloring body of Example 106, the occupancy area ratio of the brilliant resin layer was 5% with respect to a 1 cm square at any position in the porous layer.

In the discoloring body of Example 106, in a dry state, a canvas pattern having a holographic properties due to the brilliant resin layer was visually recognized on a white fabric. When water was adhered on the porous layer, the water penetrated into a part of the porous layer where the brilliant resin layer was not formed and the porous layer became transparent, and discolored to pink, and a canvas pattern having the holographic properties on the pink fabric was visually recognized. Although the state where the water was adhered indicated the above-mentioned aspect, gradually, the pink visually disappeared as the water dried, and it returned to the original white again when it was completely dried. This aspect change was able to be repeated, and had uniform brilliance in both the dry state and the water absorption state.

Further, even when the brilliant resin layer was rubbed with a finger, the brilliance was maintained without being lost.

Example 107

On a white T/C (65/35) broad fabric (weight per unit area: 120 g/cm$^2$) as a supporting body, a colored layer having a wave pattern (band-shaped colored image) in which bent band-shaped images having a width of 1 cm were arranged adjacent to each other was formed using four non-discoloring inks of pink, orange, blue, and light green. Next, on the colored layer, a solid print was performed on the entire surface with a 100-mesh screen plate using a white screen printing ink obtained by uniformly mixing and stirring 15 parts of wet-type silicic acid (trade name: NIPSIL E-200, produced by Nippon Silica Industry Co., Ltd.), 30 parts of urethane emulsion (trade name: Hydran HW-930, produced by DIC CORPORATION) (50% solid content), 40 parts of water, 0.5 parts of silicone antifoam, 3 parts of thickener for water-based ink, 1 part of ethylene glycol, and 3 parts of blocked isocyanate cross-linking agent, and the solid-printed plates was dried and cured at 130° C. for 5 minutes to form a porous layer. Separately from this, on the release sheet made of a 25 μm thick polyethylene terephthalate resin film coated with a silicone resin on the surface, a transparent polyester resin layer was provided, and an aluminum vapor deposition layer was formed after embossing to obtain a holographic transfer sheet, and a hot-melt adhesive made of a polyolefin resin was by applied to the transfer sheet with the holographic properties to provide an adhesive resin layer having a diameter of 1.0 mm, thereby obtaining a transfer sheet. After joining the adhesive resin layer and the porous layer of the transfer sheet, and pressing and bonding them with a roll heated to 100° C., the release sheet was peeled off to provide the brilliant resin layer having a dot shape with the holographic properties on the porous layer, thereby obtaining a discoloring body of Example 107.

In the discoloring body of Example 107, the occupancy area ratio of the brilliant resin layer was 80% with respect to a 1 cm square at any position in the porous layer.

In the discoloring body of Example 107, a dot pattern with the holographic properties was visually recognized on a white fabric in a dry state. When water was adhered on the porous layer, the water was absorbed by the part of the porous layer where the brilliant resin layer was not formed and the porous layer became transparent, and discolored to a wave pattern of pink, orange, blue, and light green, and the wave pattern and the dot pattern having the holographic properties were visually recognized. Although the state where the water was adhered indicated the above-mentioned aspect, gradually, the wave pattern visually disappeared as the water dried, and it returned to the original white again when it was completely dried. This aspect change was able to be repeated, and had uniform brilliance in both the dry state and the water absorption state.

Further, even when the brilliant resin layer was rubbed with a finger, the brilliance was maintained without being lost.

Example 108

Printing was performed on black synthetic paper as a supporting body by using a white printing ink obtained by uniformly mixing and stirring 15 parts of particulate silicic acid [trade name: NIPSIL E-200 A, produced by Nippon Silica Industry Co., Ltd.] produced by a wet method as a low refractive index pigment, 50 parts of water-based urethane resin [trade name: Hydran AP-10, polyester urethane resin, 30% solid content, produced by DIC CORPORATION] as binder resin, 30 parts of water, 0.5 parts of silicone antifoam, 3 parts of water-based ink thickener, 1 part of ethylene glycol, and 2 parts of epoxy crosslinking agent, and thereby a porous layer was formed. Separately from this, on the release sheet made of a 25 μm thick polyethylene terephthalate resin film coated with a silicone resin on the surface, a transparent polyester resin layer was provided, and an aluminum vapor deposition layer was formed after embossing, and a hot-melt adhesive made of a polyolefin resin was by applied so as to provide an adhesive resin layer made of a dot pattern having a diameter of 2 mm, thereby obtaining a transfer sheet. After pressure-contacting the adhesive resin layer and the porous layer of the transfer sheet, and pressing and bonding them with a roll heated to 70° C., the release sheet was peeled off to provide the brilliant resin layer having a dot pattern having a thickness of 5.0 μm with a holographic effect on the porous layer, thereby obtaining a discoloring body of Example 108.

In the discoloring body of Example 108, the occupancy area ratio of the brilliant resin layer was 50% with respect to a 1 cm square at any position in the porous layer.

In the discoloring body of Example 108, in the dry state, the dot pattern with the hologram effect was visually recognized on a white fabric in a dry state. When water was adhered on the porous layer, a part of the porous layer where the brilliant resin layer was not formed became transparent, and discolored to black, and a dot pattern having the holographic properties on a black fabric was visually recognized.

Although the state where the water was adhered indicated the above-mentioned aspect, gradually, the black visually disappeared as the water dried, and it returned to the original white again when it was completely dried. This aspect change was able to be repeated, and had uniform brilliance in both the dry state and the water absorption state.

Further, even when the brilliant resin layer was rubbed with a finger, the brilliance was maintained without being lost.

Example 109

On a white T/C (65/35) broad fabric (weight per unit area: 120 g/cm$^2$) as a supporting body, a colored layer having a wave pattern (band-shaped colored image) in which bent band-shaped images having a width of 1 cm were arranged adjacent to each other was formed using four non-discoloring fluorescent inks of fluorescent pink, fluorescent orange, fluorescent violet, and fluorescent light green. Next, on the colored layer, a solid print was performed on the entire surface with a 100-mesh screen plate using a white screen printing ink obtained by uniformly mixing and stirring 15 parts of wet-type silicic acid (trade name: NIPSIL E-200, produced by Nippon Silica Industry Co., Ltd.), 30 parts of urethane emulsion (trade name: Hydran HW-930, produced by DIC CORPORATION) (50% solid content), 40 parts of water, 0.5 parts of silicone antifoam, 3 parts of thickener for water-based ink, 1 part of ethylene glycol, and 3 parts of blocked isocyanate cross-linking agent, and the solid-printed plates was dried and cured at 130° C. for 5 minutes to form a porous layer. Separately from this, on the release sheet made of a 25 μm thick polyethylene terephthalate resin film coated with a silicone resin on the surface, a transparent polyester resin layer was provided, and an aluminum vapor deposition layer was formed after embossing to obtain a transfer sheet with the holographic properties. After joining the aluminum vapor deposition layer and the porous layer of the transfer sheet, and pressing and bonding them with a roll heated to 160° C., which is a temperature higher than the softening point of the binder resin of the porous layer, the release sheet was peeled off to provide the holographic brilliant resin layer having a shape approximating the convex portion of the fabric on the porous layer and in a size fit in a circle having a diameter of 0.5 mm, thereby obtaining a discoloring body of Example 109.

In the discoloring body of Example 109, the occupancy area ratio of the brilliant resin layer was 1% with respect to a 1 cm square at any position in the porous layer, and the occupancy area ratio of the brilliant resin layer was also 1% with respect to a 1 mm square at any position in the porous layer, The discoloring body of Example 109 had glossiness on a white fabric in a dry state, and the brilliance having holographic properties was visible on the entire surface. When water was adhered on the porous layer, the water penetrated into a part of the porous layer where the brilliant resin layer was not formed and the porous layer became transparent, and the porous layer located below the brilliant resin layer also became transparent due to the water penetration, and therefore, the part where the brilliant resin layer was not formed and the part where the brilliant resin layer was formed were discolored to a wave pattern with fluorescent pink, fluorescent orange, fluorescent violet, and fluorescent light green, and it was possible to visually recognize a bright wave pattern having a fluorescent color and the brilliance having the holographic properties. Although the state where the water was adhered indicated the above-mentioned aspect, gradually, the bright wave pattern visually disappeared as the water dried, and it returned to the original white again when it was completely dried. This aspect change was able to be repeated, and had uniform brilliance in both the dry state and the water absorption state.

Further, even when the brilliant resin layer was rubbed with a finger, the brilliance was maintained without being lost.

Example 110

On a white T/C (65/35) broad fabric (weight per unit area: 120 g/cm$^2$) as a supporting body, a colored layer having a wave pattern (band-shaped colored image) in which bent band-shaped images having a width of 1 cm were arranged adjacent to each other was formed using four non-discoloring fluorescent inks of fluorescent pink, fluorescent orange, fluorescent violet, and fluorescent light green. Next, on the colored layer, a solid print was performed on the entire surface with a 100-mesh screen plate using a white screen printing ink obtained by uniformly mixing and stirring 15 parts of wet-type silicic acid (trade name: NIPSIL E-200, produced by Nippon Silica Industry Co., Ltd.), 30 parts of urethane emulsion (trade name: Hydran HW-930, produced by DIC CORPORATION) (50% solid content), 40 parts of water, 0.5 parts of silicone antifoam, 3 parts of thickener for water-based ink, 1 part of ethylene glycol, and 3 parts of blocked isocyanate cross-linking agent, and the solid-printed plates was dried and cured at 130° C. for 5 minutes to form a porous layer. Separately from this, on the release sheet made of a 25 μm thick polyethylene terephthalate resin film coated with a silicone resin on the surface, a transparent polyester resin layer was provided, and an aluminum vapor deposition layer was formed after embossing to obtain a holographic transfer sheet, and a hot-melt adhesive made of a polyurethane resin was by applied to the holographic transfer sheet having an average thickness of 3 μm in an entirely solid state, thereby obtaining a transfer sheet. After joining the adhesive resin layer and the porous layer of the transfer sheet, and pressing and bonding them with a roll heated to 150° C., the release sheet is peeled off to provide the holographic brilliant resin layer having a shape approximating the convex portion of the fabric on the porous layer and in a size fit in a circle having a diameter of 0.5 mm, thereby obtaining a discoloring body of Example 110.

In the discoloring body of Example 110, the occupancy area ratio of the brilliant resin layer was 5% with respect to a 1 cm square at any position in the porous layer, and the occupancy area ratio of the brilliant resin layer was also 5% with respect to a 1 mm square at any position in the porous layer.

The discoloring body of Example 110 had glossiness on a white fabric in a dry state, and the brilliance having holographic properties was visible on the entire surface. When water was adhered on the porous layer, the water penetrated into a part of the porous layer where the brilliant resin layer was not formed and the porous layer became transparent, and the porous layer located below the brilliant resin layer also became transparent due to the water penetration, and therefore, the part where the brilliant resin layer was not formed and the part where the brilliant resin layer was formed were discolored to a wave pattern with fluorescent pink, fluorescent orange, fluorescent violet, and fluorescent light green, and a bright wave pattern having a fluorescent color and the brilliance having the holographic properties was visually recognized. Although the state where the water was adhered indicated the above-mentioned aspect, gradually, the wave pattern visually disappeared as the water dried, and it returned to the original white again when it was completely dried. This aspect change was able to be repeated, and had uniform brilliance in both the dry state and the water absorption state.

Further, even when the brilliant resin layer was rubbed with a finger, the brilliance was maintained without being lost.

Example 111

On a white T/C (65/35) broad fabric (weight per unit area: 120 g/cm$^2$) as a supporting body, a colored layer having a wave pattern (band-shaped colored image) in which bent band-shaped images having a width of 1 cm were arranged adjacent to each other was formed using four non-discoloring fluorescent inks of fluorescent pink, fluorescent orange, fluorescent violet, and fluorescent light green. Next, on the colored layer, a solid print was performed on the entire surface with a 100-mesh screen plate using a white screen printing ink obtained by uniformly mixing and stirring 15 parts of wet-type silicic acid (trade name: NIPSIL E-200, produced by Nippon Silica Industry Co., Ltd.), 30 parts of urethane emulsion (trade name: Hydran HW-930, produced by DIC CORPORATION) (50% solid content), 40 parts of water, 0.5 parts of silicone antifoam, 3 parts of thickener for water-based ink, 1 part of ethylene glycol, and 3 parts of blocked isocyanate cross-linking agent, and the solid-printed plates was dried and cured at 130° C. for 5 minutes to form a porous layer. Separately from this, on the release sheet made of a 25 μm thick polyethylene terephthalate resin film coated with a silicone resin on the surface, a transparent polyester resin layer was provided, and an aluminum vapor deposition layer was formed after embossing to obtain a holographic transfer sheet, and a hot-melt adhesive made of a polyurethane resin was by applied to the holographic transfer sheet having an average thickness of 5 μm in an entirely solid state, thereby obtaining a transfer sheet. After joining the adhesive resin layer and the porous layer of the transfer sheet, and pressing and bonding them with a roll heated to 180° C., the release sheet is peeled off to provide the holographic brilliant resin layer having a shape approximating the convex portion of the fabric on the porous layer and in a size fit in a circle having a diameter of 0.5 mm, thereby obtaining a discoloring body of Example 111.

In the discoloring body of Example 111, the occupancy area ratio of the brilliant resin layer was 13% with respect to a 1 cm square at any position in the porous layer, and the occupancy area ratio of the brilliant resin layer was also 13% with respect to a 1 mm square at any position in the porous layer, The discoloring body of Example 111 had glossiness on a white fabric in a dry state, and the brilliance having holographic properties was visible on the entire surface. When water was adhered on the porous layer, the water penetrated into a part of the porous layer where the brilliant resin layer was not formed and the porous layer became transparent, and the porous layer located below the brilliant resin layer also became transparent due to the water penetration, and therefore, the part where the brilliant resin layer was not formed and the part where the brilliant resin layer was formed were discolored to a wave pattern with fluorescent pink, fluorescent orange, fluorescent violet, and fluorescent light green, and a bright wave pattern having a fluorescent color and the brilliance having the holographic properties was clearly visible. Although the state where the water was adhered indicated the above-mentioned aspect, gradually, the wave pattern visually disappeared as the water dried, and it returned to the original white again when it was completely dried. This aspect change was able to be repeated, and had uniform and clear brilliance in both the dry state and the water absorption state.

Further, even when the brilliant resin layer was rubbed with a finger, the clear brilliance was maintained without being lost.

Example 112

On a pink T/C (65/35) broad fabric (weight per unit area: 120 g/cm$^2$) as a supporting body, a solid print was performed on the entire surface with a 109-mesh screen plate using a reversible thermochromic screen ink obtained by uniformly mixing and stirring 10 parts of microcapsule pigment containing a reversible thermochromic composition having color memory (blue<==> colorless, blue at 15° C. or lower, colorless at 30° C. or higher), 10 parts of acrylic ester emulsion (solid content 50%), 0.2 parts of silicone antifoam, 1 part of water, 0.5 parts of ethylene glycol, 0.5 parts of thickener, and 0.5 parts of isocyanate crosslinking agent, and the solid-printed plates was dried and cured at 130° C. for 5 minutes to form a reversible thermochromic layer (colored layer). In a state where the supporting body and the reversible thermochromic layer were laminated, when cooling to 15° C. or lower, a purple color obtained by mixing the pink color of the supporting body and the blue color of the reversible thermochromic layer was visually recognized, and this color tone was maintained at a temperature range of lower than 30° C., and when heated to 30° C. or higher, the reversible thermochromic layer became colorless, and the pink color of the supporting body was visually recognized, and this color tone was maintained at a temperature range higher than 15° C. Next, a solid print was performed on the entire surface on the reversible thermochromic layer with a 180-mesh screen plate using a white screen printing ink obtained by uniformly mixing and stirring 15 parts of fine powder silicic (trade name: NIPSIL E-200, produced by Nippon Silica Industry Co., Ltd.), 30 parts of acrylic ester emulsion (50% solid content), 50 parts of water, 0.5 parts of silicone antifoam, 3 parts of thickener for water-based ink, 1 part of ethylene glycol, and 3 parts of blocked isocyanate cross-linking agent, and the solid-printed plates was dried and cured at 130° C. for 5 minutes to form a white porous layer in a dry state. Separately from this, on the release sheet made of a 25 μm thick polyethylene terephthalate resin film coated with a silicone resin on the surface, a transparent polyester resin layer was provided, and an aluminum vapor deposition layer was formed after embossing to obtain a holographic transfer sheet, and a hot-melt adhesive made of a polyurethane resin was by applied to the holographic transfer sheet having an average thickness of 4 μm in an entirely solid state, thereby obtaining a transfer sheet. After joining the adhesive resin layer and the porous layer of the transfer sheet, and pressing and bonding them with a roll heated to 180° C., the release sheet is peeled off to provide the holographic brilliant resin layer having a shape approximating the convex portion of the fabric on the porous layer and in a size fit in a circle having a diameter of 0.5 mm, thereby obtaining a discoloring body of Example 112.

In the discoloring body of Example 112, the occupancy area ratio of the brilliant resin layer was 10% with respect to a 1 cm square at any position in the porous layer, and the occupancy area ratio of the brilliant resin layer was also 10% with respect to a 1 mm square at any position in the porous layer.

The discoloring body of Example 112 had glossiness on a white color of the porous layer in a dry state and at room temperature of 24° C., and the brilliance having the holographic properties on entire surface was clearly visible, and even when cooled or heated, the brilliance having the holographic properties was always visually recognized. When cold water of 15° C. or lower was adhered to the discoloring body of Example 112, the water penetrated into a part of the porous layer where the brilliant resin layer was not formed and the porous layer became transparent, and the porous layer located below the brilliant resin layer also became transparent due to the water penetration, and therefore, the entire surface where the color tones of the lower reversible thermochromic layer and the supporting body were mixed in both of the part where the brilliant resin layer was not formed and the part where the brilliant resin layer was formed was discolored to purple. When this purple discoloring body was left at room temperature of 24° C., the entire surface was purple in a state where water was adhered, but gradually returned from purple to white as the water evaporated, and when it returned to the dry state, the entire original surface became white. Next, when warm water of 30° C. or higher was adhered to the discoloring body of Example 112, the porous layer became transparent due to the adhesion of water, and the reversible thermochromic layer is discolored from blue to colorless, and the entire surface was discolored to pink. When this pink discoloring body was left at room temperature of 24° C., the entire surface was brilliant pink having the holographic properties on the entire surface in a state where water was adhered, but gradually returned from pink to white as the water evaporated, and when it returned to the dry state, the entire original surface became white. Next, when hot water of 30° C. or higher was adhered to a part of the discoloring body from a state where the cold water of 15° C. or lower was adhered to be discolored to purple, the water penetrated into a part of the porous layer where the brilliant resin layer was not formed and the porous layer became transparent, and the porous layer located below the brilliant resin layer also became transparent due to the water penetration, and therefore, the part where the brilliant resin layer was not formed and the part where the brilliant resin layer was formed were discolored from purple to pink, and this state was maintained until the water evaporated to be in a dry state. In this way, the discoloring body of Example 112 can be discolored to brilliant purple or brilliant pink from a white state where the entire surface had the brilliance by applying cold water or hot water, can express various color changes that can be made white having the original brilliance again by drying, and can reversibly reproduce the aspect change.

Further, even when the brilliant resin layer was rubbed with a finger, the brilliance was maintained without being lost.

Example 113

On a pink T/C (65/35) broad fabric (weight per unit area: 120 g/cm$^2$) as a supporting body, a solid print was performed on the entire surface using a photochromic printing ink obtained by uniformly mixing and stirring 1 part of 1,3,3-trimethylindolino-6'-(1-piperidinyl)-spironaphthoxazine as a photochromic compound, 10 parts of photochromic pigment in which 30 parts of styrene-α-methylstyrene copolymer [produced by Rika Hercules Co., Ltd.: Picolastic A-5] was encapsulated in a microcapsule made of a polyurea resin, 58 parts of ethylene vinyl acetate copolymer resin emulsion, 3 parts of defoamer, 1 part of thickener, 3 parts of leveling agent, and 1 part of preservative to provide a photochromic layer (colored layer) that was discolored from colorless to purple when irradiated with ultraviolet light. Thereafter, on the photochromic layer, a solid print was performed using a white screen printing ink obtained by uniformly mixing and stirring 15 parts of wet-type silicic acid (trade name: NIPSIL E-200, produced by Nippon Silica Industry Co., Ltd.), 30 parts of urethane emulsion (trade name: Hydran HW-930, produced by DIC CORPORATION) (50% solid content), 50 parts of water, 0.5 parts of silicone antifoam, 3 parts of thickener for water-based ink, and 1.5 parts of ethylene glycol to form a porous layer with different transparency in a liquid absorption state and a non-liquid absorption state. Separately from this, on the release sheet made of a 25 μm thick polyethylene terephthalate resin film coated with a silicone resin on the surface, a transparent polyester resin layer was provided, and an aluminum vapor deposition layer was formed after embossing to obtain a holographic transfer sheet, and a hot-melt adhesive made of a polyurethane resin was by applied to the holographic transfer sheet having an average thickness of 4 μm in an entirely solid state, thereby obtaining a transfer sheet. After joining the adhesive resin layer and the porous layer of the transfer sheet, and pressing and bonding them with a roll heated to 180° C., the release sheet is peeled off to provide the holographic brilliant resin layer having a shape approximating the convex portion of the fabric on the porous layer and in a size fit in a circle having a diameter of 0.5 mm, thereby obtaining a discoloring body of Example 113.

In the discoloring body of Example 113, the occupancy area ratio of the brilliant resin layer was 10% with respect to a 1 cm square at any position in the porous layer, and the occupancy area ratio of the brilliant resin layer was also 10% with respect to a 1 mm square at any position in the porous layer.

The brilliant discoloring body of Example 113 had glossiness on a white fabric in a dry state, and the brilliance having holographic properties was visible on the entire surface. When water was adhered on the porous layer indoors, the water penetrated into a part of the porous layer where the brilliant resin layer was not formed and the porous layer became transparent, and the porous layer located below the brilliant resin layer also became transparent due to the water penetration, and therefore, the part where the brilliant resin layer was not formed and the part where the brilliant resin layer was formed were discolored to pink, and in the portion where the water was adhered, the brilliant pink was clearly visible. Although the state where the water was adhered indicated the above-mentioned aspect, gradually, the pink visually disappeared as the water dried, and it returned to the original white again when it was completely dried. This aspect change was able to be repeated, and had uniform and clear brilliance in both the dry state and the water absorption state. Next, when a number "1" was drawn on the discoloring body of Example 113 with a pen configured to accommodate water in a shaft tube, the water penetrated into a part of the porous layer where the brilliant resin layer was not formed and the porous layer became transparent, and the porous layer located below the brilliant resin layer also became transparent due to the water penetration, and therefore, the part where the brilliant resin layer was not formed and the part where the brilliant resin layer was formed were discolored to brilliant pink, and the number "1" having the brilliant pink was visually recognized. Next, when it was taken out outdoors and exposed to sunlight, only the part of the photochromic layer where the porous layer became transparent was discolored, and thus the numbered part of "1" was discolored to reddish purple. Next, when left in the dark, it returns to the pink number "1" again, and when the water evaporates by drying, it returns to the original brilliant white color, and this aspect was able to be repeated many times. Further, even when the brilliant resin layer was rubbed with a finger, the clear brilliance was maintained without being lost.

Example 114

The discoloring body of Example 107 was cut and sewn to obtain a doll dress. In the doll dress, the dress having a dot pattern with the holographic properties was visually recognized on a white fabric in a dry state. When water was adhered on the porous layer with a sprayer, the water was absorbed by the part of the porous layer where the brilliant resin layer was not formed and the porous layer became transparent, and discolored to a wave pattern of pink, orange, blue, and light green, and the dress having the wave pattern and the dot pattern with the holographic properties were visually recognized. Although the state where the water was adhered indicated the above-mentioned aspect, gradually, the wave pattern visually disappeared as the water dried, and it returned to the original white dress again when it was completely dried. This aspect change was able to be repeated, and had uniform brilliance in both the dry state and the water absorption state.

Further, even when the brilliant resin layer was rubbed with a finger, the brilliance was maintained without being lost to satisfy repeated use.

Comparative Example 101

Printing was performed on black synthetic paper as a supporting body by using a white printing ink obtained by uniformly mixing and stirring 15 parts of particulate silicic acid [trade name: NIPSIL E-200 A, produced by Nippon Silica Industry Co., Ltd.] produced by a wet method as a low refractive index pigment, 50 parts of water-based urethane resin [trade name: Hydran AP-10, polyester urethane resin, 30% solid content, produced by DIC CORPORATION] as binder resin, 30 parts of water, 0.5 parts of silicone antifoam, 3 parts of water-based ink thickener, 1 part of ethylene glycol, and 2 parts of epoxy crosslinking agent to form a porous layer, and brilliant fine pieces obtained by cutting a silver metal foil into a square having a side of 2 mm with the porous layer in an undried state were uniformly attached and then dried to obtain a discoloring body of Comparative Example 101.

In the discoloring body of Comparative Example 101, in a dry state, it was visually recognized that silver brilliant fine pieces were uniformly dispersed on a white fabric. When water was adhered on the porous layer, a part of the porous layer where the brilliant fine pieces were not formed became transparent, and discolored to black, and the brilliance having an aspect differentiated depending on a viewing angle by the brilliant fine pieces on a black fabric was visually recognized. The aspect change was able to be repeated, and had different aspects of brilliance depending on the viewing angle in both the dry state and the water absorption state.

Further, when the brilliant fine piece was rubbed with a finger, it was easy to peel off and it was difficult to maintain the brilliance.

Comparative Example 102

On a white T/C (65/35) broad fabric (weight per unit area: 120 g/cm$^2$) as a supporting body, a colored layer was formed by solid printing on the entire surface using a pink non-discoloring ink. Next, on the colored layer, a solid print was performed on the entire surface with a 100-mesh screen plate using a white screen printing ink obtained by uniformly mixing and stirring 15 parts of wet-type silicic acid (trade name: NIPSIL E-200, produced by Nippon Silica Industry Co., Ltd.), 30 parts of urethane emulsion (trade name: Hydran HW-930, produced by DIC CORPORATION) (50% solid content), 40 parts of water, 0.5 parts of silicone antifoam, 3 parts of thickener for water-based ink, 1 part of ethylene glycol, and 3 parts of blocked isocyanate cross-linking agent, and the solid-printed plates was dried and cured at 130° C. for 5 minutes to form a porous layer. Separately from this, on the release sheet made of a 25 μm thick polyethylene terephthalate resin film coated with a silicone resin on the surface, a translucent brilliant resin layer with a thickness of 1.0 μm, in which an acrylic resin and a polyester resin were laminated together, was provided, and a transparent hot-melt adhesive made of a polyurethane resin was applied on the brilliant resin layer to provide an adhesive resin layer having a square dot shape with a diameter of 1.5 mm, thereby obtaining a transfer sheet. After joining the adhesive resin layer and the porous layer of the transfer sheet, and pressing and bonding them with a roll heated to 110° C., the release sheet was peeled off to provide the brilliant resin layer having a square dot shape on the porous layer, thereby obtaining a discoloring body of Comparative Example 102.

In the discoloring body of Comparative Example 102, the occupancy area ratio of the brilliant resin layer was 99% with respect to a 1 cm square at any position in the porous layer.

In the discoloring body of Comparative Example 102, in a dry state, a dot pattern having irisiness due to the brilliant resin layer was visually recognized on a white fabric. When water was adhered on the porous layer, the water penetrated into a part of the porous layer where the brilliant resin layer was not formed and the porous layer became transparent, and the porous layer located below the brilliant resin layer also became transparent due to the water penetration; however, since there are many portions where the brilliant resin layer is formed and there are few places which were discolored to pink, it was not possible to clearly recognize the color change.

Comparative Example 103

On a white T/C (65/35) broad fabric (weight per unit area: 120 g/cm$^2$) as a supporting body, a colored layer having a wave pattern (band-shaped colored image) in which bent band-shaped images having a width of 1 cm were arranged adjacent to each other was formed using four non-discoloring fluorescent inks of fluorescent pink, fluorescent orange, fluorescent violet, and fluorescent light green. Next, on the colored layer, a solid print was performed on the entire surface with a 100-mesh screen plate using a white screen printing ink obtained by uniformly mixing and stirring 15 parts of wet-type silicic acid (trade name: NIPSIL E-200, produced by Nippon Silica Industry Co., Ltd.), 30 parts of urethane emulsion (trade name: Hydran HW-930, produced by DIC CORPORATION) (50% solid content), 40 parts of water, 0.5 parts of silicone antifoam, 3 parts of thickener for water-based ink, 1 part of ethylene glycol, and 3 parts of blocked isocyanate cross-linking agent, and the solid-printed plates was dried and cured at 130° C. for 5 minutes to form a porous layer. Separately from this, on the release sheet made of a 25 μm thick polyethylene terephthalate resin film coated with a silicone resin on the surface, a transparent polyester resin layer was provided, and an aluminum vapor deposition layer was formed after embossing to obtain a transfer sheet with the holographic properties. After joining the aluminum vapor deposition layer and the porous layer of the transfer sheet, and pressing and bonding them with a roll heated to 120° C., which is a temperature higher than the softening point of the binder resin of the porous layer, the release sheet was peeled off to provide the holographic brilliant resin layer having a shape of a convex portion of the fabric on the porous layer and in a size fit in a circle having a diameter of 0.5 mm, thereby obtaining a discoloring body of Comparative Example 103.

In the discoloring body of Comparative Example 103, the occupancy area ratio of the brilliant resin layer is 0.5% with respect to a 1 cm square at any position in the porous layer, and the occupancy area ratio of the brilliant resin layer is also 0.5% with respect to a 1 mm square at an arbitrary position of the porous layer.

Although the discoloring body of Comparative Example 103 was white in a dry state, there were few portions where the brilliant resin layer was formed, and thus it was not possible to visually recognize the sufficient brilliance.

Next, an example of a discoloring body in which the glossy resin layer is a translucent resin layer is shown.

Example 201 (refer to FIG. 1)

On a white T/C (65/35) broad fabric (weight per unit area: 120 g/cm$^2$) as a supporting body 22, a colored layer 23 was formed by solid printing on the entire surface using a pink non-discoloring ink.

Next, on the colored layer, a solid print was performed on the entire surface with a 100-mesh screen plate using a white screen printing ink obtained by uniformly mixing and stirring 15 parts of wet-type silicic acid (trade name: NIPSIL E-200, produced by Nippon Silica Industry Co., Ltd.), 30 parts of urethane emulsion (trade name: Hydran HW-930, produced by DIC CORPORATION) (50% solid content), 40 parts of water, 0.5 parts of silicone antifoam, 3 parts of thickener for water-based ink, 1 part of ethylene glycol, and 3 parts of blocked isocyanate cross-linking agent, and the solid-printed plates was dried and cured at 130° C. for 5 minutes to form a porous layer 24. Separately from this, on the release sheet made of a polyethylene terephthalate resin film coated with a silicone resin on the surface, a translucent resin layer having a dot shape with a diameter of 1.5 mm was provided by gravure printing a transparent polyurethane resin to obtain a transfer sheet. After joining the translucent resin layer and the porous layer of the transfer sheet, and pressing and bonding them with a roll heated to 110° C., the release sheet was peeled off to provide the translucent resin layer 25 having a dot shape with glossiness on the porous layer, thereby obtaining a discoloring body 21 of Example 201.

In the discoloring body of Example 201, the occupancy area ratio of the translucent resin layer was 90% with respect to a 1 cm square at any position in the porous layer.

In the discoloring body of Example 201, in a dry state, a dot pattern having glossiness due to the translucent resin layer was visually recognized on a white fabric. When water was adhered on the porous layer, the water penetrated into the porous layer where the translucent resin layer was not formed and the porous layer became transparent, and the porous layer located below the translucent resin layer also became transparent due to the water penetration, and therefore, the part where the translucent resin layer was not formed and the part where the translucent resin layer was formed were discolored to pink, and the pink dot pattern having glossiness was visually recognized. Although the state where the water was adhered indicated the above-mentioned aspect, gradually, the pink visually disappeared as the water dried, and it returned to the original white again when it was completely dried. This aspect change was able to be repeated, and had glossiness in both the dry state and the water absorption state.

In addition, the glossiness was maintained without damaging the texture of the supporting body and without loss even when the translucent resin layer was rubbed with a finger.

Example 202

On a white T/C (65/35) broad fabric (weight per unit area: 120 g/cm$^2$) as a supporting body, a colored layer (band-shaped non-discolored image) having a wave pattern (band-shaped colored image) in which bent band-shaped images having a width of 1 cm were arranged adjacent to each other was formed using four non-discoloring inks of pink, orange, blue, and light green. Next, on the colored layer, a solid print was performed on the entire surface with a 100-mesh screen plate using a white screen printing ink obtained by uniformly mixing and stirring 15 parts of wet-type silicic acid (trade name: NIPSIL E-200, produced by Nippon Silica Industry Co., Ltd.), 30 parts of urethane emulsion (trade name: Hydran HW-930, produced by DIC CORPORATION) (50% solid content), 40 parts of water, 0.5 parts of silicone antifoam, 3 parts of thickener for water-based ink, 1 part of ethylene glycol, and 3 parts of blocked isocyanate cross-linking agent, and the solid-printed plates was dried and cured at 130° C. for 5 minutes to form a porous layer. Separately from this, on the release sheet made of a polyethylene terephthalate resin film coated with a silicone resin on the surface, a transparent polyurethane resin was applied by gravure printing so that regular hexagonal shapes with one side of 1.0 mm were adjacent to each other, and a translucent resin layer was provided to obtain a transfer sheet. After joining the translucent resin layer and the porous layer of the transfer sheet, and pressing and bonding them with a roll heated to 110° C., the release sheet was peeled off to provide the translucent resin layer having a regular hexagonal shape with glossiness on the porous layer, thereby obtaining a discoloring body of Example 202.

In the discoloring body of Example 202, the occupancy area ratio of the translucent resin layer was 95% with respect to a 1 cm square at any position in the porous layer.

In the discoloring body of Example 202, in a dry state, a regular hexagonal shape having glossiness due to the translucent resin layer was visually recognized on a white fabric. When water was adhered on the porous layer, the water penetrated into the porous layer where the translucent resin layer was not formed and the porous layer became transparent, and the porous layer located below the translucent resin layer also became transparent due to the water penetration, and therefore, the part where the translucent resin layer was not formed and the part where the translucent resin layer was formed were discolored to a pink, orange, blue, and light green, and the four colors of wave patterns having glossiness were visually recognized. Although the state where the water was adhered indicated the above-mentioned aspect, gradually, the wave pattern visually disappeared as the water dried, and it returned to the original white again when it was completely dried. This aspect change was able to be repeated, and had the glossiness in both the dry state and the water absorption state.

In addition, the glossiness was maintained without damaging the texture of the supporting body and without loss even when the translucent resin layer was rubbed with a finger.

Example 203

On a white polyester taffeta fabric (weight per unit area: 80 g/cm$^2$) as a supporting body, a colored layer was formed by solid printing on the entire surface using a blue non-discoloring ink. Next, on the colored layer, a solid print was performed on the entire surface with a 100-mesh screen plate using a white screen printing ink obtained by uniformly mixing and stirring 15 parts of wet-type silicic acid (trade name: NIPSIL E-200, produced by Nippon Silica Industry Co., Ltd.), 30 parts of urethane emulsion (trade name: Hydran HW-930, produced by DIC CORPORATION) (50% solid content), 40 parts of water, 0.5 parts of silicone antifoam, 3 parts of thickener for water-based ink, 1 part of ethylene glycol, and 3 parts of blocked isocyanate cross-linking agent, and the solid-printed plates was dried and cured at 130° C. for 5 minutes to form a porous layer. Separately from this, on the release sheet made of a polyethylene terephthalate resin film, a cellulose acetate resin was applied in an entirely solid state to provide a translucent protective layer with a thickness of 0.5 μm, then a transparent ethylene vinyl acetate resin was applied on the translucent protective layer by gravure printing so as to have a cracked pattern to provide a translucent resin layer, thereby obtaining a transfer sheet. After joining the translucent resin layer and the porous layer of the transfer sheet, and pressing and bonding them with a roll heated to 100° C., the release sheet was peeled off to provide the cracked patterned translucent resin layer provided with a translucent protective layer on the porous layer, thereby obtaining a discoloring body of Example 203.

In the discoloring body of Example 203, the occupancy area ratio of the translucent resin layer was 70% with respect to a 1 cm square at any position in the porous layer.

In the discoloring body of Example 203, in a dry state, a cracked pattern having glossiness due to the translucent resin layer was visually recognized on a white fabric. When water was adhered on the porous layer, the water penetrated into the porous layer where the translucent resin layer was not formed and the porous layer became transparent, and the porous layer located below the translucent resin layer also became transparent due to the water penetration, and therefore, the part where the translucent resin layer was not formed and the part where the translucent resin layer was formed were discolored to blue, and the a cracked pattern having glossiness was visually recognized. Although the state where the water was adhered indicated the above-mentioned aspect, gradually, the blue visually disappeared as the water dried, and it returned to the original white again when it was completely dried. This aspect change was able to be repeated, and had glossiness in both the dry state and the water absorption state.

In addition, the glossiness was maintained without damaging the texture of the supporting body and without loss even when the translucent resin layer was rubbed with a finger.

Example 204

On a white T/C (65/35) broad fabric (weight per unit area: 120 g/cm$^2$) as a supporting body, a colored layer was formed by solid printing on the entire surface using a pink non-discoloring ink. Next, on the colored layer, a solid print was performed on the entire surface with a 100-mesh screen plate using a white screen printing ink obtained by uniformly mixing and stirring 15 parts of wet-type silicic acid (trade name: NIPSIL E-200, produced by Nippon Silica Industry Co., Ltd.), 30 parts of urethane emulsion (trade name: Hydran HW-930, produced by DIC CORPORATION) (50% solid content), 40 parts of water, 0.5 parts of silicone antifoam, 3 parts of thickener for water-based ink, 1 part of ethylene glycol, and 3 parts of blocked isocyanate cross-linking agent, and the solid-printed plates was dried and cured at 130° C. for 5 minutes to form a porous layer. Separately from this, on the release sheet made of a polyethylene terephthalate resin film, a cellulose acetate resin was applied in an entirely solid state to provide a translucent resin layer with a thickness of 0.5 μm, thereby obtaining a transfer sheet. After joining the translucent resin layer and the porous layer of the transfer sheet, and pressing and bonding them with a roll heated to 160° C., which is a temperature higher than a softening point of the binder resin of the porous layer, the release sheet was peeled off to provide the translucent resin layer on the porous layer having a shape of a convex portion of the fabric, thereby obtaining a glossy discoloring body of Example 204.

In the discoloring body of Example 204, the occupancy area ratio of the translucent resin layer was 50% with respect to a 1 cm square at any position in the porous layer.

In the discoloring body of Example 204, in a dry state, the glossiness due to the translucent resin layer was visually recognized on a white fabric. When water was adhered on the porous layer, the water penetrated into the porous layer where the translucent resin layer was not formed and the porous layer became transparent, and the porous layer located below the translucent resin layer also became transparent due to the water penetration, and therefore, the part where the translucent resin layer was not formed and the part where the translucent resin layer was formed were discolored to pink, and the pink having glossiness was visually recognized. Although the state where the water was adhered indicated the above-mentioned aspect, gradually, the pink visually disappeared as the water dried, and it returned to the original white again when it was completely dried. This aspect change was able to be repeated, and had glossiness in both the dry state and the water absorption state.

In addition, the glossiness was maintained without damaging the texture of the supporting body and without loss even when the translucent resin layer was rubbed with a finger.

Example 205

On a white nylon taffeta fabric (weight per unit area: 80 g/cm$^2$) as a supporting body, a colored layer was formed by solid printing on the entire surface using an orange non-discoloring ink. Next, on the colored layer, a solid print was performed on the entire surface with a 100-mesh screen plate using a white screen printing ink obtained by uniformly mixing and stirring 15 parts of wet-type silicic acid (trade name: NIPSIL E-200, produced by Nippon Silica Industry Co., Ltd.), 30 parts of urethane emulsion (trade name: Hydran HW-930, produced by DIC CORPORATION) (50% solid content), 40 parts of water, 0.5 parts of silicone antifoam, 3 parts of thickener for water-based ink, 1 part of ethylene glycol, and 3 parts of blocked isocyanate cross-linking agent, and the solid-printed plates was dried and cured at 130° C. for 5 minutes to form a porous layer. Separately from this, on the release sheet made of a polyethylene terephthalate resin film having a thickness of 25 μm coated with a silicone resin on the surface, a transparent acrylic resin was printed by screen printing in a dot shape having a diameter of 2.0 mm, dried, and cured to provide a translucent resin layer, thereby obtaining a transfer sheet. After joining the translucent resin layer and the porous layer of the transfer sheet, and pressing and bonding them with a roll heated to 110° C., the release sheet was peeled off to provide the translucent resin layer having a dot shape with glossiness on the porous layer, thereby obtaining a discoloring body of Example 205.

In the discoloring body of Example 205, the occupancy area ratio of the translucent resin layer was 30% with respect to a 1 cm square at any position in the porous layer.

In the discoloring body of Example 205, in a dry state, a dot pattern having glossiness due to the translucent resin layer was visually recognized on a white fabric. When water was adhered on the porous layer, the water penetrated into the porous layer where the translucent resin layer was not formed and the porous layer became transparent, and the porous layer located below the translucent resin layer also became transparent due to the water penetration, and therefore, the part where the translucent resin layer was not formed and the part where the translucent resin layer was formed were discolored to orange, and the orange dot pattern having glossiness was visually recognized. Although the state where the water was adhered indicated the above-mentioned aspect, gradually, the orange visually disappeared as the water dried, and it returned to the original white again when it was completely dried. This aspect change was able to be repeated, and had glossiness in both the dry state and the water absorption state.

In addition, the glossiness was maintained without damaging the texture of the supporting body and without loss even when the translucent resin layer was rubbed with a finger.

Example 206

On a white T/C (65/35) broad fabric (weight per unit area: 120 g/cm$^2$) as a supporting body, a colored layer was formed by solid printing on the entire surface using a pink non-discoloring ink. Next, on the colored layer, a solid print was performed on the entire surface with a 100-mesh screen plate using a white screen printing ink obtained by uniformly mixing and stirring 15 parts of wet-type silicic acid (trade name: NIPSIL E-200, produced by Nippon Silica Industry Co., Ltd.), 30 parts of urethane emulsion (trade name: Hydran HW-930, produced by DIC CORPORATION) (50% solid content), 40 parts of water, 0.5 parts of silicone antifoam, 3 parts of thickener for water-based ink, 1 part of ethylene glycol, and 3 parts of blocked isocyanate cross-linking agent, and the solid-printed plates was dried and cured at 130° C. for 5 minutes to form a porous layer. Next, a canvas-patterned translucent resin layer made of a transparent polyurethane resin was provided on the porous layer by gravure printing. Separately from this, on the release sheet made of a 25 μm thick polyethylene terephthalate resin film coated with a silicone resin on the surface, an acrylic resin was applied in an entirely solid state to provide a translucent protective layer, thereby obtaining a transfer sheet. After joining the translucent protective layer and translucent resin layer of the transfer sheet, and pressing and bonding them with a roll heated to 110° C., the release sheet was peeled off to provide the canvas-patterned translucent resin layer provided with a translucent protective layer on the porous layer, thereby obtaining a discoloring body of Example 206.

In the discoloring body of Example 206, the occupancy area ratio of the translucent resin layer was 20% with respect to a 1 cm square at any position in the porous layer.

In the discoloring body of Example 206, in a dry state, a canvas pattern having glossiness due to the translucent resin layer was visually recognized on a white fabric. When water was adhered on the porous layer, the water penetrated into the porous layer where the translucent resin layer was not formed and the porous layer became transparent, and the porous layer located below the translucent resin layer also became transparent due to the water penetration, and therefore, the part where the translucent resin layer was not formed and the part where the translucent resin layer was formed were discolored to pink, and the pink canvas pattern having glossiness was visually recognized. Although the state where the water was adhered indicated the above-mentioned aspect, gradually, the pink visually disappeared as the water dried, and it returned to the original white again when it was completely dried. This aspect change was able to be repeated, and had glossiness in both the dry state and the water absorption state.

In addition, the glossiness was maintained without damaging the texture of the supporting body and without loss even when the translucent resin layer was rubbed with a finger.

Example 207

Printing was performed on black synthetic paper as a supporting body by using a white printing ink obtained by uniformly mixing and stirring 15 parts of particulate silicic acid [trade name: NIPSIL E-200 A, produced by Nippon Silica Industry Co., Ltd.] produced by a wet method as a low refractive index pigment, 50 parts of water-based urethane resin [trade name: Hydran AP-10, polyester urethane resin, 30% solid content, produced by DIC CORPORATION] as binder resin, 30 parts of water, 0.5 parts of silicone antifoam, 3 parts of water-based ink thickener, 1 part of ethylene glycol, and 2 parts of epoxy crosslinking agent, and thereby a porous layer was formed. Separately from this, on the release sheet made of a polyethylene terephthalate resin film coated with a silicone resin on the surface, a transparent polyolefin resin was applied by gravure printing so as to have a dot shape with a diameter of 1.5 mm, and dried and cured to provide a translucent resin layer, thereby obtaining a transfer sheet. After joining the translucent resin layer and the porous layer of the transfer sheet, and pressing and bonding them with a roll heated to 70° C., the release sheet was peeled off to provide the translucent resin layer having a dot shape with glossiness on the porous layer, thereby obtaining a discoloring body of Example 207.

In the discoloring body of Example 207, the occupancy area ratio of the translucent resin layer was 80% with respect to a 1 cm square at any position in the porous layer.

In the discoloring body of Example 207, in a dry state, a dot pattern having glossiness due to the translucent resin layer was visually recognized on a white fabric. When water was adhered on the porous layer, the water penetrated into the porous layer where the translucent resin layer was not formed and the porous layer became transparent, and the porous layer located below the translucent resin layer also became transparent due to the water penetration, and therefore, the part where the translucent resin layer was not formed and the part where the translucent resin layer was formed were discolored to black, and the black dot pattern having glossiness was visually recognized.

Although the state where the water was adhered indicated the above-mentioned aspect, gradually, the black visually disappeared as the water dried, and it returned to the original white again when it was completely dried. This aspect change was able to be repeated, and had glossiness in both the dry state and the water absorption state.

Further, even when the translucent resin layer was rubbed with a finger, the glossiness was maintained without being lost.

Example 208

On a white T/C (65/35) broad fabric (weight per unit area: 120 g/cm$^2$) as a supporting body, a colored layer having a wave pattern (band-shaped colored image) in which bent band-shaped images having a width of 1 cm were arranged adjacent to each other was formed using four non-discoloring fluorescent inks of fluorescent pink, fluorescent orange, fluorescent violet, and fluorescent light green. Next, on the colored layer, a solid print was performed on the entire surface with a 100-mesh screen plate using a white screen printing ink obtained by uniformly mixing and stirring 15 parts of wet-type silicic acid (trade name: NIPSIL E-200, produced by Nippon Silica Industry Co., Ltd.), 30 parts of urethane emulsion (trade name: Hydran HW-930, produced by DIC CORPORATION) (50% solid content), 40 parts of water, 0.5 parts of silicone antifoam, 3 parts of thickener for water-based ink, 1 part of ethylene glycol, and 3 parts of blocked isocyanate cross-linking agent, and the solid-printed plates was dried and cured at 130° C. for 5 minutes to form a porous layer. Separately from this, on the release sheet made of a 25 μm thick polyethylene terephthalate resin film coated with a silicone resin on the surface, a transparent acrylic resin was printed by gravure printing in an entirely solid state, dried, and cured to provide a translucent resin layer with a thickness of 10 μm, thereby obtaining a transfer sheet. After joining the translucent resin layer and the porous layer of the transfer sheet, and pressing and bonding them with a roll heated to 160° C., which is a temperature higher than the softening point of the binder resin of the porous layer, the release sheet was peeled off to provide the translucent resin layer having a shape approximating the convex portion of the fabric on the porous layer and in a size fit in a circle having a diameter of 0.5 mm, thereby obtaining a discoloring body of Example 208.

In the discoloring body of Example 208, the occupancy area ratio of the translucent resin layer was 1% with respect to a 1 cm square at any position in the porous layer, and the occupancy area ratio of the translucent resin layer was also 1% with respect to a 1 mm square at any position in the porous layer.

In the discoloring body of Example 208, in a dry state, the surface glossiness due to the translucent resin layer was able to be visually recognized on a white fabric. When water was adhered on the porous layer, the porous layer in the part where the translucent resin layer was not formed absorbed water and became transparent, and changed to the wave pattern having fluorescent pink, fluorescent orange, fluorescent violet, and fluorescent light green, and it was possible to visually recognize a vivid wave pattern made of fluorescent colors and glossiness due to the translucent resin layer. Although the state where the water was adhered indicated the above-mentioned aspect, gradually, the bright wave pattern visually disappeared as the water dried, and it returned to the original white again when it was completely dried. This aspect change was able to be repeated, and had uniform surface glossiness in both the dry state and the water absorption state.

Further, even when the translucent resin layer was rubbed with a finger, the glossiness was maintained without being lost.

Example 209

On a white T/C (65/35) broad fabric (weight per unit area: 120 g/cm$^2$) as a supporting body, a colored layer having a wave pattern (band-shaped colored image) in which bent band-shaped images having a width of 1 cm were arranged adjacent to each other was formed using four non-discoloring fluorescent inks of fluorescent pink, fluorescent orange, fluorescent violet, and fluorescent light green. Next, on the colored layer, a solid print was performed on the entire surface with a 100-mesh screen plate using a white screen printing ink obtained by uniformly mixing and stirring 15 parts of wet-type silicic acid (trade name: NIPSIL E-200, produced by Nippon Silica Industry Co., Ltd.), 30 parts of urethane emulsion (trade name: Hydran HW-930, produced by DIC CORPORATION) (50% solid content), 40 parts of water, 0.5 parts of silicone antifoam, 3 parts of thickener for water-based ink, 1 part of ethylene glycol, and 3 parts of blocked isocyanate cross-linking agent, and the solid-printed plates was dried and cured at 130° C. for 5 minutes to form a porous layer. Separately from this, on the release sheet made of a 25 μm thick polyethylene terephthalate resin film coated with a silicone resin on the surface, a transparent acrylic resin was printed by gravure printing in an entirely solid state, dried, and cured to provide a translucent resin layer with a thickness of 10 μm, and further, on the translucent resin layer, a hot melt type adhesive made of polyurethane resin was applied in an entirely solid state with a mean thickness of 3 μm to obtain a transfer sheet. After joining the adhesive resin layer and the porous layer of the transfer sheet, and pressing and bonding them with a roll heated to 150° C., the release sheet is peeled off to provide the translucent resin layer having a shape approximating the convex portion of the fabric on the porous layer and in a size fit in a circle having a diameter of 0.5 mm, thereby obtaining a discoloring body of Example 209.

In the discoloring body of Example 209, an area ratio of a part where the translucent resin layer was formed was 5% per 1 $cm^2$ per 1 cm square at any 10 locations in the porous layer, and an area ratio of a part where the translucent resin layer was formed was also 5% per 1 mm square at any 10 locations in the porous layer.

In the discoloring body of Example 209, in a dry state, the surface glossiness due to the translucent resin layer was visually recognized on a white fabric. When water was adhered on the porous layer, the porous layer in the part where the translucent resin layer was not formed absorbed water and became transparent, and changed to the wave pattern having fluorescent pink, fluorescent orange, fluorescent violet, and fluorescent light green, and thereby a vivid wave pattern made of fluorescent colors and glossiness due to the translucent resin layer were visually recognized. Although the state where the water was adhered indicated the above-mentioned aspect, gradually, the bright wave pattern visually disappeared as the water dried, and it returned to the original white again when it was completely dried. This aspect change was able to be repeated, and had uniform surface glossiness in both the dry state and the water absorption state.

Further, even when the translucent resin layer was rubbed with a finger, the glossiness was maintained without being lost.

Example 210

On a white T/C (65/35) broad fabric (weight per unit area: 120 $g/cm^2$) as a supporting body, a colored layer having a wave pattern (band-shaped colored image) in which bent band-shaped images having a width of 1 cm were arranged adjacent to each other was formed using four non-discoloring fluorescent inks of fluorescent pink, fluorescent orange, fluorescent violet, and fluorescent light green. Next, on the colored layer, a solid print was performed on the entire surface with a 100-mesh screen plate using a white screen printing ink obtained by uniformly mixing and stirring 15 parts of wet-type silicic acid (trade name: NIPSIL E-200, produced by Nippon Silica Industry Co., Ltd.), 30 parts of urethane emulsion (trade name: Hydran HW-930, produced by DIC CORPORATION) (50% solid content), 40 parts of water, 0.5 parts of silicone antifoam, 3 parts of thickener for water-based ink, 1 part of ethylene glycol, and 3 parts of blocked isocyanate cross-linking agent, and the solid-printed plates was dried and cured at 130° C. for 5 minutes to form a porous layer. Separately from this, on the release sheet made of a 25 μm thick polyethylene terephthalate resin film coated with a silicone resin on the surface, a transparent acrylic resin was printed by gravure printing in an entirely solid state, dried, and cured to provide a translucent resin layer with a thickness of 10 μm, and further, on the translucent resin layer, a hot melt type adhesive made of polyurethane resin was applied in an entirely solid state with a mean thickness of 5 μm to obtain a transfer sheet. After joining the adhesive resin layer and the porous layer of the transfer sheet, and pressing and bonding them with a roll heated to 180° C., the release sheet is peeled off to provide the translucent resin layer having a shape approximating the convex portion of the fabric on the porous layer and in a size fit in a circle having a diameter of 0.5 mm, thereby obtaining a discoloring body of Example 210.

In the discoloring body of Example 210, the occupancy area ratio of the translucent resin layer was 13% with respect to a 1 cm square at any position in the porous layer, and the occupancy area ratio of the translucent resin layer was also 13% with respect to a 1 mm square at any position in the porous layer.

In the discoloring body of Example 210, in a dry state, the surface glossiness due to the translucent resin layer was visually recognized on a white fabric. When water was adhered on the porous layer, the porous layer in the part where the translucent resin layer was not formed absorbed water and became transparent, and changed to the wave pattern having fluorescent pink, fluorescent orange, fluorescent violet, and fluorescent light green, and thereby a vivid wave pattern made of fluorescent colors and glossiness due to the translucent resin layer were clearly visible. Although the state where the water was adhered indicated the above-mentioned aspect, gradually, the bright wave pattern visually disappeared as the water dried, and it returned to the original white again when it was completely dried. This aspect change was able to be repeated, and had uniform and clear surface glossiness in both the dry state and the water absorption state.

Further, even when the translucent resin layer was rubbed with a finger, the glossiness was maintained without being lost.

Example 211

On a pink T/C (65/35) broad fabric (weight per unit area: 120 $g/cm^2$) as a supporting body, a solid print was performed on the entire surface with a 109-mesh screen plate using a reversible thermochromic screen ink obtained by uniformly mixing and stirring 10 parts of microcapsule pigment containing a reversible thermochromic composition having color memory (blue<==> colorless, blue at 15° C. or lower, colorless at 30° C. or higher), 10 parts of acrylic ester emulsion (solid content 50%), 0.2 parts of silicone antifoam, 1 part of water, 0.5 parts of ethylene glycol, 0.5 parts of thickener, and 0.5 parts of isocyanate crosslinking agent, and the solid-printed plates was dried and cured at 130° C. for 5 minutes to form a reversible thermochromic layer (colored layer). In a state where the supporting body and the reversible thermochromic layer were laminated, when cooling to 15° C. or lower, a purple color obtained by mixing the pink color of the supporting body and the blue color of the reversible thermochromic layer was visually recognized, and this color tone was maintained at a temperature range of lower than 30° C., and when heated to 30° C. or higher, the reversible thermochromic layer became colorless, and the pink color of the supporting body was visually recognized, and this color tone was maintained at a temperature range higher than 15° C. Next, a solid print was performed on the entire surface on the reversible thermochromic layer with a 180-mesh screen plate using a white screen printing ink obtained by uniformly mixing and stirring 15 parts of fine powder silicic (trade name: NIPSIL E-200, produced by Nippon Silica Industry Co., Ltd.), 30 parts of acrylic ester emulsion (50% solid content), 50 parts of water, 0.5 parts of silicone antifoam, 3 parts of thickener for water-based ink, 1 part of ethylene glycol, and 3 parts of blocked isocyanate cross-linking agent, and the solid-printed plates was dried and cured at 130° C. for 5 minutes to form a white porous layer in a dry state. Separately from this, on the release sheet made of a 25 μm thick polyethylene terephthalate resin film coated with a silicone resin on the surface, a transparent acrylic resin was printed by gravure printing in an entirely solid state, dried, and cured to provide a translucent resin layer with a thickness of 10 μm, and further, on the translucent resin layer, a hot melt type adhesive made of polyurethane resin was applied in an entirely solid state with a mean thickness of 4 μm to obtain a transfer sheet. After joining the adhesive resin layer and the porous layer of the transfer sheet, and pressing and bonding them with a roll heated to 180° C., the release sheet is peeled off to provide the translucent resin layer having a shape approximating the convex portion of the fabric on the porous layer and in a size fit in a circle having a diameter of 0.5 mm, thereby obtaining a discoloring body of Example 211.

In the discoloring body of Example 211, the occupancy area ratio of the translucent resin layer was 10% with respect to a 1 cm square at any position in the porous layer, and the occupancy area ratio of the translucent resin layer was also 10% with respect to a 1 mm square at any position in the porous layer.

In the discoloring body of Example 211, the surface glossiness of the translucent resin layer is clearly visible on the white of the porous layer in a dry state and at a room temperature of 24° C., and was always with glossiness even when cooled or heated. When cold water of 15° C. or lower was adhered to the discoloring body of Example 211, the porous layer became transparent due to the adhesion of water, and discolored to purple in which a color tone of the lower reversible thermochromic layer and the supporting body was mixed. When this purple discoloring body was left at room temperature of 24° C., the entire surface was purple in a state where water was adhered, but gradually returned from purple to white as the water evaporated, and when it returned to the dry state, the entire original surface became white. Next, when warm water of 30° C. or higher was adhered to this discoloring body, the porous layer became transparent due to the adhesion of water, and the reversible thermochromic layer is discolored from blue to colorless, and the entire surface was discolored to pink. When this pink discoloring body was left at room temperature of 24° C., the entire surface was glossy pink having on the entire surface in a state where water was adhered, but gradually returned from pink to white as the water evaporated, and when it returned to the dry state, the entire original surface became white. Next, in the state where the porous layer was discolored to purple when cold water of 15° C. or lower was adhered, if warm water of 30° C. or higher was adhered to a part of the discoloring body, the color was changed from purple to pink, and this state was maintained until the water evaporated and became in a dry state. In this way, the discoloring body of Example 211 can be discolored to glossy purple or glossy pink from a white state where the entire surface had the glossiness by applying cold water or hot water, can express various color changes that can be made white having the original glossiness on the entire surface again by drying, and can reversibly reproduce the aspect change.

Further, even when the translucent resin layer was rubbed with a finger, the glossiness was maintained without being lost.

Example 212

On a pink T/C (65/35) broad fabric (weight per unit area: 120 g/cm$^2$) as a supporting body, a solid print was performed on the entire surface using a photochromic printing ink obtained by uniformly mixing and stirring 1 part of 1,3,3-trimethylindolino-6'-(1-piperidinyl)-spironaphthoxazine as a photochromic compound, 10 parts of photochromic pigment in which 30 parts of styrene-α-methylstyrene copolymer [produced by Rika Hercules Co., Ltd.: Piccolastic A-5] was encapsulated in a microcapsule made of a polyurea resin, 58 parts of ethylene vinyl acetate copolymer resin emulsion, 3 parts of defoamer, 1 part of thickener, 3 parts of leveling agent, and 1 part of preservative to provide a photochromic layer (colored layer) that was discolored from colorless to purple when irradiated with ultraviolet light. Thereafter, on the photochromic layer, a solid print was performed using a white screen printing ink obtained by uniformly mixing and stirring 15 parts of wet-type silicic acid (trade name: NIPSIL E-200, produced by Nippon Silica Industry Co., Ltd.), 30 parts of urethane emulsion (trade name: Hydran HW-930, produced by DIC CORPORATION) (50% solid content), 50 parts of water, 0.5 parts of silicone antifoam, 3 parts of thickener for water-based ink, and 1.5 parts of ethylene glycol to form a porous layer with different transparency in a liquid absorption state and a non-liquid absorption state. Separately from this, on the release sheet made of a 25 μm thick polyethylene terephthalate resin film coated with a silicone resin on the surface, a transparent acrylic resin was printed by gravure printing in an entirely solid state, dried, and cured to provide a translucent resin layer with a thickness of 10 μm, and further, on the translucent resin layer, a hot melt type adhesive made of polyurethane resin was applied in an entirely solid state with a mean thickness of 4 μm to obtain a transfer sheet.

After joining the adhesive resin layer and the porous layer of the transfer sheet, and pressing and bonding them with a roll heated to 180° C., the release sheet is peeled off to provide the translucent resin layer having a shape approximating the convex portion of the fabric on the porous layer and in a size fit in a circle having a diameter of 0.5 mm, thereby obtaining a discoloring body of Example 212.

In the discoloring body of Example 212, the occupancy area ratio of the translucent resin layer was 10% with respect to a 1 cm square at any position in the porous layer, and the occupancy area ratio of the translucent resin layer was also 10% with respect to a 1 mm square at any position in the porous layer.

In the discoloring body of Example 212, in a dry state, the surface glossiness due to the translucent resin layer was visually recognized on a white fabric. When water was adhered on the porous layer indoors, the water penetrated into a part of the porous layer where the translucent resin layer was not formed and the porous layer became transparent, and the porous layer located below the translucent resin layer also became transparent due to the water penetration, and therefore, the part where the translucent resin layer was not formed and the part where the translucent resin layer was formed were discolored to pink, and in the portion where the water was adhered, the glossy pink was clearly visible. Although the state where the water was adhered indicated the above-mentioned aspect, gradually, the pink visually disappeared as the water dried, and it returned to the original glossy white again when it was completely dried. This aspect change was able to be repeated, and had uniform and clear glossiness in both the dry state and the water absorption state.

Next, when a number “1” was drawn on the discoloring body of Example 212 with a pen configured to accommodate water in a shaft tube, the water penetrated into a part of the porous layer where the translucent resin layer was not formed and the porous layer became transparent, and the porous layer located below the translucent resin layer also became transparent due to the water penetration, and therefore, the part where the translucent resin layer was not formed and the part where the translucent resin layer was formed were discolored to pink, and the number “1” having the glossy pink was visually recognized.

Next, when it was taken out outdoors and exposed to sunlight, only the part of the photochromic layer where the porous layer became transparent was discolored, and thus only the part of "1" was discolored to reddish purple. Next, when left in the dark, it returns to the pink "1" again, and when the water evaporates by drying, it returns to the original glossy white color, and this aspect was able to be repeated many times.

Further, even when the translucent resin layer was rubbed with a finger, the clear glossiness was maintained without being lost.

Comparative Example 201

On a white T/C (65/35) broad fabric (weight per unit area: 120 g/cm$^2$) as a supporting body, a colored layer was formed by solid printing on the entire surface using a pink non-discoloring ink. Next, on the colored layer, a solid print was performed on the entire surface with a 100-mesh screen plate using a white screen printing ink obtained by uniformly mixing and stirring 15 parts of wet-type silicic acid (trade name: NIPSIL E-200, produced by Nippon Silica Industry Co., Ltd.), 30 parts of urethane emulsion (trade name: Hydran HW-930, produced by DIC CORPORATION) (50% solid content), 40 parts of water, 0.5 parts of silicone antifoam, 3 parts of thickener for water-based ink, 1 part of ethylene glycol, and 3 parts of blocked isocyanate cross-linking agent, and the solid-printed plates was dried and cured at 130° C. for 5 minutes to form a porous layer. Separately from this, on the release sheet made of a polyethylene terephthalate resin film coated with a silicone resin on the surface, a translucent resin layer having a square dot shape with a diameter of 1.5 mm was provided by gravure printing a transparent polyurethane resin to obtain a transfer sheet. After joining the translucent resin layer and the porous layer of the transfer sheet, and pressing and bonding them with a roll heated to 110° C., the release sheet was peeled off to provide the translucent resin layer having a dot shape with glossiness on the porous layer, thereby obtaining a discoloring body of Comparative Example 201.

In the discoloring body of Comparative Example 201, the occupancy area ratio of the translucent resin layer was 99% with respect to a 1 cm square at any position in the porous layer.

In the discoloring body of Comparative Example 201, in a dry state, a dot pattern having glossiness due to the translucent resin layer was visually recognized on a white fabric. When water was adhered on the porous layer, the water penetrated into the porous layer where the translucent resin layer was not formed and the porous layer became transparent, and the porous layer located below the translucent resin layer also became transparent due to the water penetration; however, since there are many portions where the translucent resin layer is formed and there are few places which were discolored to pink, it was not possible to clearly recognize the color change.

Comparative Example 202

On a white T/C (65/35) broad fabric (weight per unit area: 120 g/cm$^2$) as a supporting body, a colored layer having a wave pattern (band-shaped colored image) in which bent band-shaped images having a width of 1 cm were arranged adjacent to each other was formed using four non-discoloring fluorescent inks of fluorescent pink, fluorescent orange, fluorescent violet, and fluorescent light green. Next, on the colored layer, a solid print was performed on the entire surface with a 100-mesh screen plate using a white screen printing ink obtained by uniformly mixing and stirring 15 parts of wet-type silicic acid (trade name: NIPSIL E-200, produced by Nippon Silica Industry Co., Ltd.), 30 parts of urethane emulsion (trade name: Hydran HW-930, produced by DIC CORPORATION) (50% solid content), 40 parts of water, 0.5 parts of silicone antifoam, 3 parts of thickener for water-based ink, 1 part of ethylene glycol, and 3 parts of blocked isocyanate cross-linking agent, and the solid-printed plates was dried and cured at 130° C. for 5 minutes to form a porous layer. Separately from this, on the release sheet made of a 25 μm thick polyethylene terephthalate resin film coated with a silicone resin on the surface, a transparent acrylic resin was printed by gravure printing in an entirely solid state, dried, and cured to provide a translucent resin layer with a thickness of 10 μm, thereby obtaining a transfer sheet. After joining the translucent resin layer and the porous layer of the transfer sheet, and pressing and bonding them with a roll heated to 160° C., which is a temperature higher than the softening point of the binder resin of the porous layer, the release sheet was peeled off to provide the translucent resin layer having a shape approximating the convex portion of the fabric on the porous layer and in a size fit in a circle having a diameter of 0.5 mm, thereby obtaining a discoloring body of Comparative Example 202.

In the discoloring body of Comparative Example 202, the occupancy area ratio of the translucent resin layer was 0.5% with respect to a 1 cm square at any position in the porous layer, and the occupancy area ratio of the translucent resin layer was also 0.5% with respect to a 1 mm square at any position in the porous layer.

Although the discoloring body of Comparative Example 202 was white in a dry state, there were few portions where the translucent resin layer was formed, and thus it was not possible to visually recognize the sufficient glossiness.

REFERENCE SIGNS LIST

11 Discoloring body
12 Supporting body
13 Colored layer
14 Porous layer
15 Adhesive resin layer
16 Brilliant resin layer
21 Discoloring body
22 Supporting body
23 Colored layer
24 Porous layer
25 Translucent resin layer

The invention claimed is:

1. A method for producing a discoloring body, the discoloring body comprising:

a supporting body;

a porous layer capable of reversibly changing color upon contact with water, wherein the porous layer has a low refractive index pigment fixed in a dispersed state by way of a binder resin; and a glossy resin layer formed above the porous layer, wherein the glossy layer is a brilliant resin layer having optical properties selected from the group consisting of: metallic glossiness, irisiness holographic properties, and pearl glossiness, the method comprising:

obtaining a transfer sheet by applying a brilliant resin on a base material having releasability, placing the transfer sheet on the porous layer formed on the supporting body, thermocompression bonding the porous layer and the transfer sheet, and forming the glossy resin layer from the brilliant resin on the supporting body so that an occupancy area ratio of the glossy resin layer is 1% to 95% with respect to a 1 mm square at any position in the porous layer.

2. The method according to claim 1, wherein a thickness of the brilliant resin layer is 0.1 to 20 μm.

3. The method according to claim 1, wherein the brilliant resin layer has a holographic property and comprises circles each having a diameter of 0.5 mm.

4. The method according to claim 1, further comprising:

forming a colored layer between the supporting body and the porous layer.

5. The method according to claim 4, wherein a coloring agent contained in the colored layer is selected from the group consisting of a fluorescent coloring agent, a thermochromic coloring agent, and a photochromic coloring agent.

6. The method according to claim 1, wherein thermocompression bonding is carried out at temperature higher than the softening point of the binder resin.

7. The method according to claim 1, further comprising:

forming an adhesive resin layer between the porous layer and the brilliant resin layer before thermocompression bonding.

8. The method according to claim 1, wherein the supporting body is a fabric.

* * * * *